United States Patent
Sasaki et al.

(10) Patent No.: US 7,019,427 B2
(45) Date of Patent: Mar. 28, 2006

(54) PERMANENT MAGNET SYNCHRONOUS MOTOR

(75) Inventors: Kenji Sasaki, Kadoma (JP); Teruo Tamura, Ikoma (JP); Michihiro Yoshida, Takefu (JP); Toru Takimoto, Takefu (JP); Hideyuki Taniguchi, Takefu (JP); Hiroyuki Uesaka, Takefu (JP)

(73) Assignees: Matsushita Electric Industrial Co., Ltd., Osaka (JP); Matsushita Refrigeration Company, Osaka (JP)

( * ) Notice: Subject to any disclaimer, the term of this patent is extended or adjusted under 35 U.S.C. 154(b) by 0 days.

(21) Appl. No.: 11/035,196

(22) Filed: Jan. 14, 2005

(65) Prior Publication Data

US 2005/0121991 A1    Jun. 9, 2005

Related U.S. Application Data

(62) Division of application No. 10/792,726, filed on Mar. 5, 2004, now Pat. No. 6,876,119, which is a division of application No. 10/019,286, filed as application No. PCT/JP00/04693 on Jul. 13, 2000, now Pat. No. 6,727,627.

(30) Foreign Application Priority Data

| Jul. 16, 1999 | (JP) | ................................ 11-203080 |
| Jul. 16, 1999 | (JP) | ................................ 11-203081 |
| Sep. 10, 1999 | (JP) | ................................ 11-257035 |
| Sep. 27, 1999 | (JP) | ................................ 11-272391 |
| Jun. 1, 2000 | (JP) | ............................ 2000-164285 |
| Jun. 1, 2000 | (JP) | ............................ 2000-164286 |

(51) Int. Cl.
*H02K 21/12* (2006.01)
*H02K 1/27* (2006.01)
*H02K 17/16* (2006.01)

(52) U.S. Cl. ........................... 310/156.78; 310/156.79; 310/156.82; 310/156.53; 310/156.56; 310/211

(58) Field of Classification Search ........... 310/156.53, 310/156.56, 156.78–156.83, 216, 261, 211, 310/156.08, 156.22
See application file for complete search history.

(56) References Cited

U.S. PATENT DOCUMENTS 4,309,635 A    1/1982   Sei et al.

(Continued)

FOREIGN PATENT DOCUMENTS

CH    458510    8/1968

(Continued)

OTHER PUBLICATIONS

English Language Abstract of JP 29-23179.

(Continued)

*Primary Examiner*—Tran Nguyen
(74) *Attorney, Agent, or Firm*—Greenblum & Bernstein, P.L.C.

(57) ABSTRACT

A synchronous motor includes a stator, a rotor and permanent magnets. The rotor includes a rotor iron core rotatable relative to the stator, and a plurality of conductor bars accommodated within corresponding slots in the rotor iron core. The conductor bars have their opposite ends shortcircuited by respective shortcircuit rings to form a starter cage conductor. The rotor also has a plurality of magnet retaining slots defined therein at a location on an inner side of the conductor bars, in which hole permanent magnets are embedded.

8 Claims, 20 Drawing Sheets

U.S. PATENT DOCUMENTS

| | | | |
|---|---|---|---|
| 4,322,648 A | | 3/1982 | Ray et al. |
| 4,358,696 A | * | 11/1982 | Liu et al. ............... 310/156.84 |
| 4,403,161 A | | 9/1983 | Miyashita et al. |
| 4,454,438 A | * | 6/1984 | Yamashita et al. .......... 310/162 |
| 4,760,300 A | | 7/1988 | Yoshida et al. |
| 4,845,837 A | | 7/1989 | Lloyd |
| 5,097,166 A | | 3/1992 | Mikulic |
| 5,444,319 A | | 8/1995 | Nakamura et al. |
| 5,729,885 A | | 3/1998 | Carosa et al. |
| 6,088,906 A | | 7/2000 | Hsu et al. |
| 6,727,627 B1 | | 4/2004 | Sasaki et al. |

FOREIGN PATENT DOCUMENTS

| | | |
|---|---|---|
| EP | 0352573 | 1/1990 |
| GB | 1177247 | 1/1970 |
| GB | 1552694 | 9/1979 |
| JP | PJ-353020515 * 2/1978 | ............ 310/156.78 |
| JP | 54-148214 | 11/1979 |
| JP | 355106062 | 8/1980 |
| JP | PJ-357186966 * 11/1982 | ............ 310/156.78 |
| JP | 59-23179 | 5/1984 |
| JP | 63-20105 | 4/1988 |
| JP | 405304736 | 4/1992 |
| JP | 406165451 | 6/1994 |
| JP | 9-182332 | 7/1997 |
| JP | 9-308195 | 11/1997 |

OTHER PUBLICATIONS

English Language Abstract of JP 63-20105.
English Language Abstract of JP 9-182332.

* cited by examiner

US 7,019,427 B2

PERMANENT MAGNET SYNCHRONOUS MOTOR

This Application is a divisional application of U.S. patent application Ser. No. 10/792,726, filed on Mar. 5, 2004, which is a divisional of U.S. patent application Ser. No. 10/019,286, now U.S. Pat. No. 6,727,627, filed on Jan. 2, 2002, which was the National Stage of International Application No. PCT/JP00/04693, filed on Jul. 13, 2000, the disclosures of which are expressly incorporated herein by references in their entireties. The International Application was published under PCT Article 21 (2) in English.

TECHNICAL FIELD

The present invention generally relates to a permanent magnet synchronous motor and, more particularly, to the synchronous motor generally used in a motor-driven compressor in a refrigerating system or an air conditioning system or any other industrially utilized electric appliance.

BACKGROUND ART

A self-starting permanent magnet synchronous motor operates as an inductor motor at the time of starting thereof owing to a starter squirrel cage conductor and as a synchronous motor as rotating magnetic poles created by the permanent magnets are entrained by a rotating magnetic field formed by a stator winding and moving angularly at a synchronous speed upon arrival of the rotor at a speed approaching the synchronous speed. This synchronous motor has an excellent constant speed operating performance and an excellent high efficiency. In particular, various improvement have hitherto been made to a rotor structure of the synchronous motor.

For example, the Japanese Patent Publications No. 59-23179 and No. 63-20105 discloses the prior art rotor structure for the self-starting permanent magnet synchronous motor.

FIG. 6 illustrates the prior art rotor disclosed in the Japanese Patent Publication No. 59-23179. Referring to FIG. 6, reference numeral 1 represents a rotor and reference numeral 2 represents a rotor iron core having a plurality of slots 3 defined therein adjacent an outer periphery thereof. Conductor bars 4 are disposed within those slots 3 and have their opposite ends shortcircuited by respective shortcircuit rings to thereby form a starter squirrel cage conductor. The shortcircuit rings (not shown) are made of an annular electroconductive material disposed on axially opposite ends of the rotor iron core and are connected with the conductor bars 4. A plurality of magnet retaining holes 5 are provided on an inner side of the conductor bars 4, with corresponding permanent magnets 6 embedded therein. Reference numeral 7 represents magnetic flux shortcircuit preventive slits that are spaced such a small distance P from the magnet retaining holes 5 that magnetic saturation can take place between the magnet retaining holes 5 and the slits 7 to thereby prevent the magnetic fluxes emanating from the permanent magnets from being shortcircuited between the different magnetic poles.

FIG. 58 illustrates a longitudinal sectional view of the rotor used in the prior art self-starting synchronous motor disclosed in the Japanese Patent Publication No. 63-20105 and FIG. 59 illustrates a cross-sectional view taken along the line A–A' in FIG. 58. Referring to FIGS. 58 and 59, reference numeral 11 represents a rotor, and reference numeral 12 represents a rotor iron core made up of a laminate of electromagnetic steel plates. Reference numeral 13 represents conductor bars having their opposite ends connected with respective shortcircuit rings 14 to thereby form a starter squirrel cage conductor. Reference numeral 15 represents permanent magnets embedded in the rotor iron core to form four rotor magnetic poles. Reference numeral 16 represents magnetic flux shortcircuit preventive slits each operable to present the magnetic fluxed between the neighboring permanent magnets of the different polarities from being shortcircuited. Reference numeral 17 represents an end plate disposed on each of axially opposite ends of the rotor iron core 2 by means of bolts to avoid any possible separation of the permanent magnets 5 from the rotor iron core 2.

When the prior art permanent magnet motor of the type provided with the cage conductor is to be used since the conductor bars and the permanent magnets are employed as rotatory drive elements, if the conductor bars and the permanent magnets are incorrectly positioned relative to each other, a force generated from the conductor bars and a force generated by the permanent magnets will be counteracted with each other and, therefore, no efficient rotatory drive will be achieved. Also, the permanent magnet motor provided with such a cage conductor requires a complicated and increased number of manufacturing steps since the permanent magnets and the conductor bars are provided in the rotor.

In view of the foregoing, the present invention is intended to solve those problems inherent in the prior art permanent magnet synchronous motor and is to increase the efficiency and simplify the manufacture of the synchronous motor of the type employing the permanent magnets.

DISCLOSURE OF INVENTION

To this end, the present invention according to a first aspect thereof provides a synchronous motor which comprises a stator including a stator iron core having a winding wound therearound, said stator iron core having an inner cylindrical surface; a rotor including a rotor iron core and rotatably accommodated while facing the inner cylindrical surface of the stator iron core, said rotor including a plurality of conductor bars accommodated within corresponding slots defined in an outer peripheral portion of the rotor iron core, said conductor bars having their opposite ends shortcircuited by respective shortcircuit rings to form a starter squirrel cage conductor, said rotor having a plurality of magnet retaining slots defined therein at a location on an inner side of the conductor bars; and permanent magnets embedded within the magnet retaining holes in the rotor and defining rotor magnetic poles. In this synchronous motor, the neighboring members of the slots are spaced a distance which is referred to as a slot interval, the slot interval at a location adjacent one end of rotor magnetic poles being smaller than the slot interval at a location adjacent a center point of the rotor magnetic poles.

According to the first aspect of the present invention, the magnetic fluxes emanating from the permanent magnets will hardly leak to the outer peripheral surface of the rotor at a position adjacent opposite ends of the rotor magnetic poles and, instead leak to the outer peripheral surface of the rotor at a position adjacent a center point of the rotor magnetic poles. For this reason, the pattern of distribution of the magnetic fluxes in an air gap between the stator and the rotor represents a generally trapezoidal or sinusoidal waveform such that as compared with the rectangular waveform, the amount of change of the magnetic fluxes per unitary time increases and, therefore, the voltage induced across the winding of the stator can be increased to thereby intensify the rotor magnetic poles. Accordingly, in the practice of the present invention, to secure the required induced voltage, neither is the volume of the permanent magnets increased, nor the permanent magnets having a high residual magnetic flux density are required such as required in the prior art, thus making it possible to provide a high-performance and inexpensive self-starting synchronous motor having a required out-of-step torque and a high efficiency.

If the slot interval at a location spaced from the center point of the rotor magnetic poles in a direction conforming to a direction of rotation of the rotor is chosen to be greater than the slot interval at a location spaced from the center point of the rotor magnetic poles in a direction counter to the direction of rotation of the rotor, although during a loaded operation the maximum value of a distribution, on the rotor surface, of composite magnetic fluxes of the magnetic fluxes from the winding of the stator and the magnetic fluxes from the permanent magnets is positioned on one side conforming to the direction of rotation rather than the center point of the rotor magnetic poles, since the slot interval of the rotor through which the magnetic fluxes at that position pass is increased, the magnetic saturation at that portion can be prevented. Accordingly, the magnetic fluxes emanating from the magnets can be sufficiently taken from the rotor and, therefore, the current across the stator winding can be suppressed to thereby increase the efficiency of the motor.

The present invention according to a second aspect thereof provides a synchronous motor which comprises a stator including stator iron core having a winding wound therearound, said stator iron core having an inner cylindrical surface; a rotor including a rotor iron core and rotatably accommodated while facing the inner cylindrical surface of the stator iron core, said rotor including a plurality of conductor bars accommodated within corresponding slots defined in an outer peripheral portion of the rotor iron core, said conductor bars having their opposite ends shortcircuited by respective shortcircuit rings to form a starter squirrel cage conductor, said rotor having a plurality of magnet retaining slots defined therein at a location on an inner side of the conductor bars; and permanent magnets embedded within the magnet retaining holes in the rotor and defining rotor magnetic poles. In this synchronous motor, the slots have a radial length that is smaller at a center point of the rotor magnetic poles, and a distance between one of the slots positioned adjacent one end of the rotor magnetic poles and the magnet retaining holes is smaller than a distance between the slots positioned at other locations of the rotor and the magnet retaining holes.

According to the second aspect of the present invention, the magnetic fluxes emanating from the permanent magnets will hardly leak to the outer peripheral surface of the rotor at a position adjacent opposite ends of the rotor magnetic poles and, instead leak to the outer peripheral surface of the rotor at a position adjacent a center point of the rotor magnetic poles. For this reason, the pattern of distribution of the magnetic fluxes in an air gap between the stator and the rotor represents a generally trapezoidal or sinusoidal waveform such that as compared with the rectangular waveform, the amount of change of the magnetic fluxes per unitary time increases and, therefore, the voltage induced across the winding of the stator can be increased to thereby intensity the rotor magnetic poles. Accordingly, in the practice of the present invention, to secure the required induced voltage, neither is the volume of the permanent magnets increased, nor the permanent magnets having a high residual magnetic flux density are required such as required in the prior art, thus making it possible to provide a high-performance and inexpensive self-starting synchronous motor having a required out-of-step torque and a high efficiency.

Preferably, the distance between the slots in the rotor iron core and the magnet retaining holes progressively increases from a position adjacent one end of the rotor magnetic poles towards a position adjacent the center point of the rotor magnetic poles.

The present invention according to a third aspect thereof provides a synchronous motor which comprises a stator including a stator iron core having two-pole windings wound therearound, said stator iron core having an inner cylindrical surface; a rotor including a rotor iron core and rotatably accommodated while facing the inner cylindrical surface of the stator iron core, said rotor including a plurality of conductor bars positioned adjacent an outer periphery of the rotor iron core, and shortcircuit rings positioned at axially opposite ends of the rotor iron core, said conductor bars and shortcircuit rings being integrally molded together by means of an aluminum die casting to form a starter squirrel cage conductor, said rotor having a plurality of magnet retaining slots defined therein at a location on the inner side of the conductor bars; and permanent magnets embedded within the magnet retaining holes in the rotor and defining two magnetic poles of different polarities. In this synchronous motor, the shortcircuit rings have an inner diameter positioned outside the associated magnet retaining holes, the inner diameter of the shortcircuit rings at a location adjacent one end of the magnetic poles being chosen to be greater than an inner diametric dimension at a location adjacent the center point of the magnetic poles.

According to this structure, the width of the permanent magnets can be increased and, therefore, with no need to increase the axial length of the permanent magnets, the requires area of surface of the magnetic poles of the permanent magnets can be secured. Accordingly, there is no need to laminate thickness of the rotor iron core, thereby decreasing the cost.

The inner diameter of the shortcircuit rings on one side where the permanent magnets are inserted may lie outside the magnet retaining holes in the rotor iron core, in which case the inner diametric dimension of one of the shortcircuit rings adjacent one end of the magnetic poles is chosen to be greater than the inner diametric dimension thereof adjacent the center point of the magnetic poles, and the inner diametric dimension of the other of the shortcircuit rings lies inwardly of the whole or a part of the magnet retaining holes. In this structure, an end plate made of a non-magnetizable plate is preferably positioned between such other shortcircuit ring and the rotor iron core so as to cover the magnet retaining holes.

This is particularly advantageous in that not only is there no need to increase the laminate thickness of the rotor iron, but also the cross-section of the other shortcircuit ring is increased to reduce the resistance, and therefore, the number of revolution of the motor at the time of a maximum torque can increase during a period the motor subsequent to the start thereof attains a synchronous speed, thereby increasing the starting performance of the motor.

Also preferably, the inner diameter of the shortcircuit rings on one side where the permanent magnets are inserted lies outside the magnet retaining holes in the rotor iron core, and the inner diametric dimension of one of the shortcircuit rings adjacent one end of the magnetic poles is chosen to be greater than the inner diametric dimension thereof adjacent the center point of the magnetic poles, whereas the inner diametric dimension of the other of the shortcircuit rings lies inwardly of the whole or a part of the magnet retaining holes. In such case, however, one or a plurality of electromagnetic steel plates of the rotor iron core adjacent the other shortcircuit ring is or are not formed with the magnet retaining holes.

The inner diameter of the shortcircuit rings on one side where the permanent magnets are inserted may be of a shape lying along the magnet retaining holes in the rotor iron core.

Where the stator iron core is made up of a stator laminate of electromagnetic steel plates and the rotor iron core is also made up of a rotor laminate of electromagnetic steel plates, the stator laminate has a thickness about equal to that of the rotor laminate.

The present invention in a fourth aspect thereof provides a synchronous motor which comprises a stator including a stator iron core having a winding wound therearound and also having an inner cylindrical surface; a rotor including a rotor iron core in the form of a rotor laminate of a plurality of electromagnetic steel plates and rotatably accommodated while facing the inner cylindrical surface of the stator iron core, said rotor iron core including a magnet retaining portion provided with magnet retaining slots, a magnetic flux shortcircuit preventive portion coupled with the magnet retaining portion and provided with magnetic flux shortcircuit preventive holes communicated with the magnet retaining holes, and a rotor outer end portion coupled with the magnetic flux shortcircuit preventive portion and provided with holes communicated with the magnetic flux shortcircuit preventive holes; and permanent magnets embedded within the magnet retaining holes in the rotor and defining rotor magnetic poles. In this structure, the magnetic flux shortcircuit preventive holes are smaller than the magnet retaining holes such that by allowing the permanent magnets to be held in engagement with outer edges of the magnetic flux shortcircuit preventive holes, the permanent magnets are axially positioned.

This structure is advantageous in that the axial position of the permanent magnets can be determined relying only on the rotor iron core and, accordingly, the cost required for assemblage and component parts can be reduced.

The present invention in a fifth aspect thereof provides a synchronous motor which comprises a stator including a stator iron core having a winding wound therearound, said stator iron core having an inner cylindrical surface; a rotor including a rotor iron core in the form of a rotor laminate of a plurality of iron plates and rotatably accommodated while facing the inner cylindrical surface of the stator iron core, said rotor iron core including a magnet retaining portion provided with magnet remaining slots, and a permanent magnet support portion coupled with the magnet retaining portion and closing the magnet retaining holes; and permanent magnets embedded within the magnet retaining holes in the rotor and defining rotor magnetic poles. The permanent magnets being axially positioned by means of the permanent magnet support portion.

This structure is advantageous in that the axial position of the permanent magnets can be determined relying only on the rotor iron core and, since one ends of the magnet retaining holes can be closed by the rotor iron plate, closure of the magnet retaining hole by means of the end plate secured to the opposite ends of the magnet retaining holes is effective to permit the use of only one end plate to close the opposite ends of the magnet retaining holes.

An outer end of the rotor iron core may be coupled with the permanent magnet support portion and provided with hole positioned axially of the magnet retaining holes. In this case, the magnetic resistance of a magnetic circuit between the N and S poles at the axially opposite ends of the permanent magnets can be increased to reduce the leakage of the magnetic fluxes, resulting in increase of the motor characteristic.

Preferably, a starter squirrel cage conductor in the rotor iron core may be employed in the synchronous motor according to the fifth aspect of the present invention.

The present invention in a sixth aspect thereof provides a synchronous motor which comprises a stator including a stator iron core having a winding wound therearound, said stator iron core having an inner cylindrical surface; a rotor including a rotor iron core and rotatably accommodated while facing the inner cylindrical surface of the stator iron core, said rotor including a plurality of conductor bars positioned adjacent an outer periphery of the rotor iron core and shortcircuit rings positioned at axially opposite ends of the rotor iron core, said conductor bars and said shortcircuit rings being integrally molded together by means of an aluminum die casting to form a starter squirrel cage conductor, said rotor iron core having a plurality of magnet retaining holes defined therein; and permanent magnets embedded within the magnet retaining holes at a location on the inner side of the conductor bars, said magnet retaining holes having a width in a radial direction of the rotor iron core being greater at a location inwardly of an axial direction of the rotor than at a location adjacent one end of the axial direction of the rotor.

According to this structure, even though shrinkage stresses generated as the shortcircuit rings after the aluminum die casting cools while undergoing shrinkage act on the ends of the rotor iron core, the gap between the permanent magnets and the magnet retaining holes can be maintained at a proper value and, therefore, the insertion of the permanent magnets into the magnet retaining holes can easily be attained, thereby securing a high-performance motor characteristics.

Where the width of the magnet retaining holes in the radial direction is smaller at opposite ends of the axial direction of the rotor than at a location inwardly of the axial direction of the rotor and further comprising an electromagnetic steel plate provided outside one of the opposite ends of the axial direction of the rotor for closing the magnet retaining holes, the use of only one end plate is sufficient and, therefore, the cost required for the end plate and the number of assembling steps can advantageously be reduced.

Also, where the width of the magnet retaining holes in the radial direction is greater at one of opposite ends of the axial direction of the rotor than at a location inwardly of the axial direction of the rotor and wherein the other of the opposite ends of the axial direction of the rotor is not provided with any magnet retaining holes for closing the magnet retaining holes at a location inwardly of the axial direction of the rotor, not only is the use of only one end plate sufficient, but also the number of combinations of the electromagnetic steel plates is minimized to form the rotor iron core, thereby facilitating manufacture of the motor having a high-performance.

The present invention in a seventh aspect thereof provides a synchronous motor which comprises a stator including a stator iron core having a winding wound therearound, said stator iron core having an inner cylindrical surface; a rotor including a rotor iron core and rotatably accommodated while facing the inner cylindrical surface of the stator iron core, said rotor including a plurality of conductor bars positioned adjacent an outer periphery of the rotor iron core and shortcircuit rings positioned at axially opposite ends of the rotor iron core, said conductor bars and said shortcircuit rings being integrally molded together by means of an aluminum die casting to form a starter squirrel cage conductor, said rotor iron core having a plurality of magnet retaining holes defined therein; and permanent magnets embedded within the magnet retaining holes at a location on the inner side of the conductor bars. The rotor iron core employed is in the form of a laminate of electromagnetic steel plates and including an entwining portion provided adjacent the magnet retaining holes for lamination of the electromagnetic steel plates, and the magnet retaining holes adjacent the entwining portion has a width in a radial direction thereof which is partially enlarged in a direction towards the entwining portion.

According to this structure, even though when the entwining portion is formed by the use of any known press work, portions of the electromagnetic steel plates adjacent the entwining portion protrude under the influence of press stresses, the gap between the permanent magnets and the magnet retaining holes can be maintained at a proper value to thereby facilitate insertion of the permanent magnets and also to provide a high-performance motor characteristic.

The present invention in an eight aspect thereof provides a synchronous motor which comprises a stator including a stator iron core having a winding wound therearound, said stator iron core having an inner cylindrical surface; a rotor including a rotor iron core and rotatably accommodated while facing the inner cylindrical surface of the stator iron core, said rotor including a plurality of conductor bars positioned adjacent an outer periphery of the rotor iron core and shortcircuit rings positioned at axially opposite ends of the rotor iron core, said conductor bars and said shortcircuit rings being integrally molded together by means of an aluminum die casting to form a starter squirrel cage conductor, said rotor iron core having a plurality of magnet retaining holes defined therein; and permanent magnets embedded within the magnet retaining holes at a location on the inner side of the conductor bars. The rotor iron core has conductor bar holes defined therein in an axial direction thereof and positioned inwardly of the magnet retaining holes, and the conductor bar holes are filled up by the aluminum die casting simultaneously with the starter squirrel cage conductor. The conductor bars so filled protrude a distance outwardly from an axial end of the rotor iron core to form respective projections for securement of an end plate. The end plate is made of a non-magnetizable material and secured fixedly to the end of the rotor iron core.

This structure is effective in that after the starter squirrel cage conductor and the projections for securement of the end plate have been formed simultaneously by the use of the aluminum die casting technique, engaging the projections into the engagement holes in the end plate and staking or crimping respective tips of the projections result in firm connection of the end plate to the end face of the rotor iron core and, therefore, with no need to employ any bolts, the end plate can easily be secured to the end of the rotor iron core. This permits reduction in cost for material and facilitates assemblage of the motor.

The end plate disposed at the axial end of the rotor iron core may be partly or wholly covered by the corresponding shortcircuit ring, in which case a job of connecting the end plate to the end face of the rotor iron core is sufficient at only one side of the rotor iron core.

The end plate covered by the shortcircuit ring may be provided with projections engageable in respective holes in the rotor iron core, so that positioning of the end plate can easily be performed and, also, the possibility can be eliminated which the end plate may displace from the right position under the influence of flow of a high-pressure aluminum melt during the aluminum die casting.

Also, one or a plurality of electromagnetic steel plates at one axial end of the rotor iron core may not be provided with any magnet retaining hole, in which case only one end plate is sufficient at the opposite axial end of the rotor iron core, thereby reducing the cost for material and the number of assembling steps.

In addition, projections may be provided at a location where the electromagnetic steel plates not provided with any magnet retaining holes contact the permanent magnets, so as to protrude towards the permanent magnets. In this case, the permanent magnets can be axially positioned upon engagement only with the projections and, therefore, the magnetic flux shortcircuit between the different poles of the permanent magnets through the electromagnetic steel plates can be reduced considerably, thereby increasing the performance of the motor.

The present invention in a ninth aspect thereof provides a synchronous motor which comprises a stator including a stator iron core having a winding wound therearound, said stator iron core having an inner cylindrical surface; a rotor including a rotor iron core and rotatably accommodated while facing the inner cylindrical surface of the stator iron core, said rotor including a plurality of conductor bars positioned adjacent an outer periphery of the rotor iron core and shortcircuit rings positioned at axially opposite ends of the rotor iron core, said conductor bars and said shortcircuit rings being integrally molded together by means of an aluminum die casting to form a starter squirrel cage conductor, said rotor iron core having a plurality of magnet retaining holes defined therein, one of the shortcircuit rings having an inner periphery formed with recesses; permanent magnets embedded within the magnet retaining holes at a location on the inner side of the conductor bars; and an end plate made of a non-magnetizable material and having an outer periphery formed with projections complemental in shape to the recesses in the shortcircuit ring, a peripheral portion of each of the recesses in the shortcircuit ring being axially pressed to deform to thereby secure the end plate to an axial end of the rotor iron core with the projections in the end plate received in the corresponding recesses in the shortcircuit ring.

Thus, after the end plate can be mounted on the shortcircuit rings with the projections aligned with and received in the corresponding recess in the shortcircuit rings, pressing the respective peripheral portions of the recesses in the shortcircuit rings to deform results in fixing of the end plate to the end face of the rotor iron core, thereby facilitating the fitting of the end plate.

The present invention according to a tenth aspect thereof provides a synchronous motor which comprises a stator including a stator iron core having a winding wound therearound, said stator iron core having an inner cylindrical surface; a rotor including a rotor iron core and rotatably accommodated while facing the inner cylindrical surface of the stator iron core, said rotor including a plurality of conductor bars positioned adjacent an outer periphery of the rotor iron core and shortcircuit rings positioned at axially opposite ends of the rotor iron core, said conductor bars and said shortcircuit rings being integrally molded together by means of an aluminum die casting to form a starter squirrel cage conductor, said rotor iron core having a plurality of magnet retaining holes defined therein, one of the shortcircuit rings having an inner periphery formed with recesses; permanent magnets embedded within the magnet retaining holes at a location on the inner side of the conductor bars; said magnet retaining holes being of a design allowing the permanent magnets, when embedded therein so as to be butted end-to-end in a generally V-shaped configuration to form a single magnetic pole, and having an air space defined between one end face of the permanent magnet and an inner face of one end of the magnet retaining hole for preventing shortcircuit of magnetic fluxes, a barrier slot for preventing shortcircuit of magnetic fluxes being defined between the magnet retaining holes for accommodating the neighboring permanent magnets of different polarities, a first bridge portion being provided between the magnet retaining hole and the barrier slot so as to sandwich the barrier slot, and a second bridge portion being provided between the neighboring permanent magnets of the same polarity and the corresponding magnet retaining holes, said second bridge portion being narrow at a location adjacent a center of the rotor and large at a location adjacent an outer periphery of the rotor.

This structure is effective not only to avoid shortcircuit of the magnetic fluxes between the different poles at the end faces of the permanent magnets to thereby increase the motor performance, but also to reduce the shrinkage strain of the rotor iron core outer diameter at the center of the rotor magnetic poles, that have resulted from shrinkage of the shortcircuit rings in a radial direction thereof after the aluminum die casting, to a very small value because of the strength of the bridge portion having been increased. Therefore, the gap size between the stator iron core inner diameter and the rotor iron core outer diameter can be accurately obtained merely by blanking the electromagnetic steel plates for the rotor iron core by the use of any known press work and the outer diameter of the rotor iron core need not be ground, thereby reducing the number of assembling steps.

The present invention according to an eleventh aspect thereof provides a synchronous motor which comprises a stator including a stator iron core having a winding wound therearound, said stator iron core having an inner cylindrical surface; a rotor including a rotor iron core and rotatably accommodated while facing the inner cylindrical surface of the stator iron core, said rotor including a plurality of conductor bars positioned adjacent an outer periphery of the rotor iron core and shortcircuit rings positioned at axially opposite ends of the rotor iron core, said conductor bars and said shortcircuit rings being integrally molded together by means of an aluminum die casting to form a starter squirrel cage conductor, said rotor iron core having a plurality of magnet retaining holes defined therein, one of the shortcircuit rings having an inner periphery-formed with recesses; permanent magnets embedded within the magnet retaining holes at a location on the inner side of the conductor bars to provide two magnetic poles; said rotor iron core increasing from axially opposite ends thereof towards a center point of the length of the rotor to render it to represent a generally oval shape, the permanent magnets being mounted after formation of the starter squirrel cage conductor by means of the aluminum die casting.

According to this structure, even if the shrinkage strain of the rotor iron core outer diameter in a radial direction increases towards the center of the rotor magnetic poles after the aluminum die casting, the outer diameter of the rotor iron core after shrinkage can be kept to the right round shape and, therefore, the gap size between the stator iron core inner diameter and the rotor iron core outer diameter can be accurately obtained merely by blanking the electromagnetic steel plates for the rotor iron core by the use of any known press work and the outer diameter of the rotor iron core need not be ground, thereby reducing the number of assembling steps. Also, since the aluminum die casting is performed while the permanent magnets and the end plates have not yet been fitted, the job can easily be performed without incurring any defective component parts, thereby increasing the productivity.

Where the permanent magnets are employed in the form of a rare earth magnet, a strong magnetic force can be obtained and both the rotor and the motor itself can advantageously manufactured in a compact size and lightweight.

BRIEF DESCRIPTION OF DRAWINGS

The present invention will become readily understood from the following description of preferred embodiments thereof made with reference to the accompanying drawings, in which like parts are designated by like reference numerals and in which.

BEST MODE FOR CARRYING OUT THE INVENTION

FIRST EMBODIMENT (FIGS. 1 AND 2)

Figure 1:
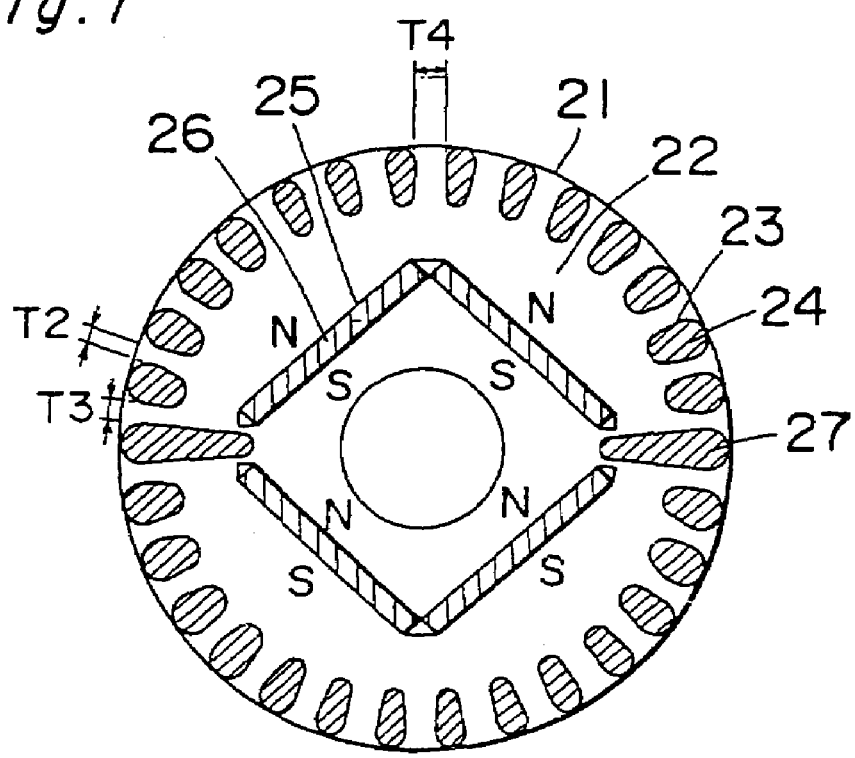
FIG. 1 is a transverse sectional view of a rotor used in a synchronous motor according to a first preferred embodiment of the present invention.

FIG. 1 illustrates a transverse sectional view of a rotor used in a self-starting synchronous motor of a type utilizing permanent magnets according to a first preferred embodiment of the present invention. In this figure, reference numeral 21 represents a rotor, and reference numeral 22 represents a rotor iron core. The rotor iron core 22 has a plurality of slots 23 defined in an outer peripheral portion thereof for accommodating a corresponding number of conductor bars 24, which are integrally molded together with shortcircuit rings (not shown) at axially spaced opposite ends of the rotor iron core 22 by the use of any known aluminum die casting to thereby provide a starter squirrel cage conductor. Permanent magnets 26 are embedded in respective magnet retaining holes defined in the rotor iron core 23 at a location radially inwardly of a round row of the conductor bars 24.

So far shown in FIG. 1, two plate-like permanent magnets 26 are butted end-to-end in a generally V-shaped configuration to form a single rotor magnetic pole and, since four permanent magnets are employed in the rotor, two rotor magnetic poles are formed. Reference characters T2 and T3 represents the interval between the neighboring slots 23 positioned adjacent the rotor magnetic poles defined by the permanent magnets, and reference character T4 represents the interval between the neighboring slots 23 positioned adjacent a center point between the rotor magnetic poles. In the illustrated embodiment, the intervals T2 and T3 are chosen to be smaller than the interval T4.

Figure 2:
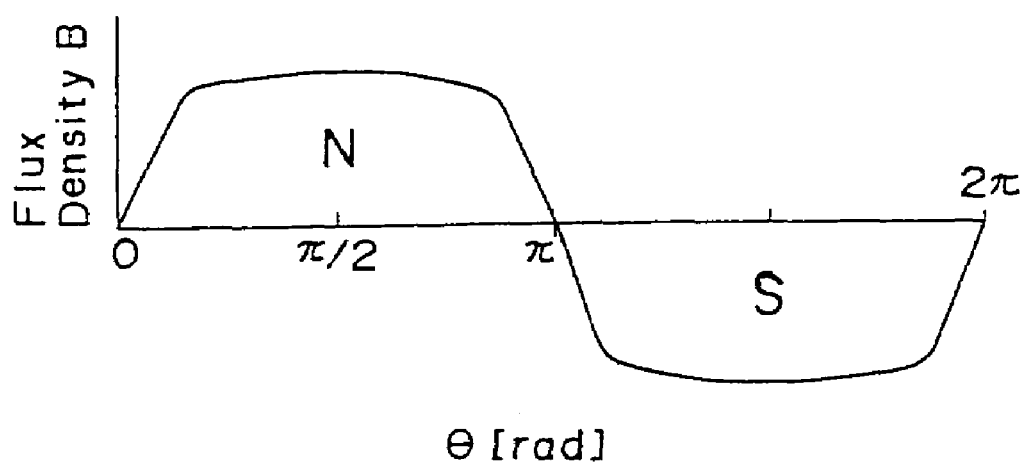
FIG. 2 is a chart showing a pattern of distribution of magnetic flux densities in a gap between a stator and the rotor.

FIG. 2 is a chart showing a pattern of distribution of magnetic flux densities in an air gap between the rotor and the stator, wherein the axis of ordinates represents the magnetic flux density B and the axis of abscissas represents the angle θ of the air gap in a direction conforming to the direction of rotation of the rotor with the origin represented by the center point between the rotor magnetic pole. Since at a position adjacent the ends of the rotor magnetic poles the intervals T2 and T3 are smaller than the interval T4 at the center points of the rotor magnetic poles, magnetic fluxes emanating from the permanent magnets 26 do hardly leak to the outer peripheral surface of the rotor 21 and, instead, leak to the outer peripheral surface adjacent the center points of the rotor magnetic poles. For this reason, the pattern of distribution of the magnetic flux densities in the air gap between the stator and the rotor 21 represents a generally trapezoidal waveform or a generally sinusoidal waveform and, since as compared with a rectangular waveform the amount of change of the magnetic fluxes per unitary time increases, it is possible to increase the voltage induced across the winding of the stator.

In contrast thereto, in the prior art self-starting permanent magnet synchronous motor, the slots in the rotor iron core are circumferentially spaced at regular intervals and have the same radial lengths as measured in a direction radially of the rotor iron core and, therefore, the pattern of distribution of the magnetic flux densities tends to represents a rectangular waveform. In general, the intensity of the rotor magnetic poles brought about by the permanent magnets can be relatively grasped by measuring the magnitude of the voltage induced across the winding of the stator when the rotor is externally rotated while no voltage is applied to the motor.

The relation between the shape of the pattern of distribution of the magnetic flux densities in the air gap between the stator and the rotor and the voltage induced across the stator winding by the action of the rotor magnetic poles will now be discussed as applied to the two-pole self-starting motor of the type utilizing the permanent magnets.

Figure 7:
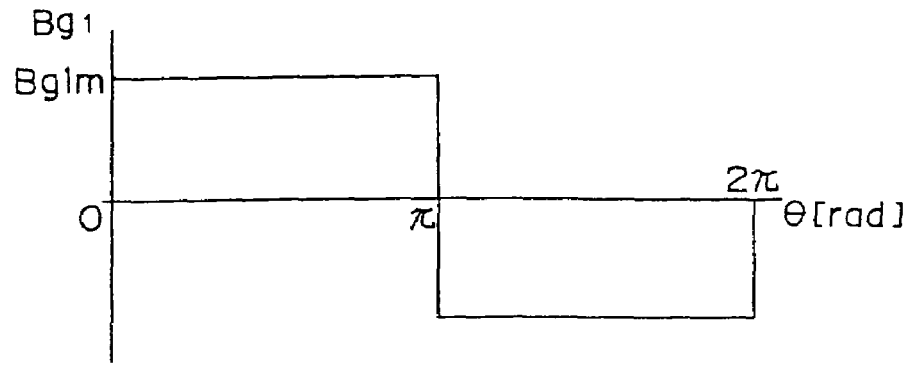
FIG. 7 is a chart showing the prior art self-starting synchronous motor exhibiting a pattern of distribution of magnetic flux densities in the gap between the stator and the rotor, which pattern represents a rectangular waveform.
Figure 8:
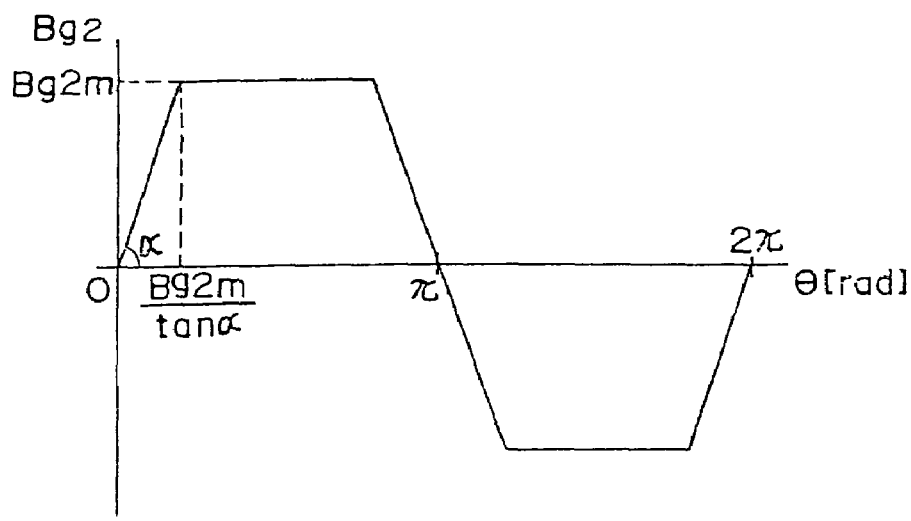
FIG. 8 is a chart showing the magnetic flux density distribution pattern representing a generally trapezoidal waveform.

The case in which the pattern $Bg(\theta)$ of distribution of the magnetic flux densities in the air gap represents a rectangular waveform, $Bg1(\theta)$ is shown in FIG. 7, and the case in which the pattern of distribution of the magnetic flux densities in the air gap represents a generally trapezoidal waveform $Bg2(\theta)$ is shown in FIG. 8. The axis of abscissas represents the angle θ of the air gap in a direction conforming to the direction of rotation with the point of origin represented by the center point between the rotor magnetic poles. In FIG. 7, $Bg1m$ represents a maximum value of $Bg1(\theta)$ that can be expressed by the following equations:

$$Bg1(\theta)=Bg1m \quad \text{(when } 0 \leq \theta \leq \pi) \tag{1}$$

$$Bg1(\theta)=-Bg1m \quad \text{(when } \pi \leq \theta \leq 2) \tag{2}$$

In FIG. 8, $Bg2m$ represents a maximum value of $Bg2(\theta)$ that can be expressed by the following equations if the angle α of inclination of $Bg2(\theta)$ from θ=0.

$$Bg2(\theta)=\theta \tan \alpha \quad \text{(when } 0 \leq \theta \leq Bg2m/\tan \alpha) \tag{3}$$

$$Bg2(\theta)=Bg2m \quad \text{(when } Bg2m/\tan \alpha \leq \theta \leq \pi-B2m/\tan \alpha) \tag{4}$$

$$B2(\theta)=-\theta \tan \alpha + \pi \tan \alpha \quad \text{(when } \pi-Bg2m/\tan \alpha \leq \theta \leq \pi) \tag{5}$$

It is assumed that the magnetic fluxes of the permanent magnets will nor be shortcircuited within the rotor and are all flow through the stator iron core. Accordingly, regardless of the shape of the waveform of the pattern of distribution of the magnetic flux densities in the air gap the amount of the magnetic fluxes flowing in the stator is constant and the area of surface of the waveform for each magnetic pole remains the same as can be expressed by the following equation:

$$B_{g1m}\pi = B_{g2m}[\pi - (B_{g2m}/\tan \alpha)] \tag{6}$$

Although the stator winding is distributed over a region corresponding to one magnetic pole, the stator winding can be arranged intensively in a width of an angle π in a direction conforming to the direction of rotation corresponding to the single magnetic pole and the number of turns thereof assumed to be n. The amount of the magnetic fluxes φ passing through the winding during rotation of the rotor magnetic poles at an angular velocity ω(t) can be expressed by the following equation:

$$\Phi(t) = \int_{\omega t}^{\omega t+\pi} B_g(\theta)\, d\theta \tag{7}$$

Figure 9:
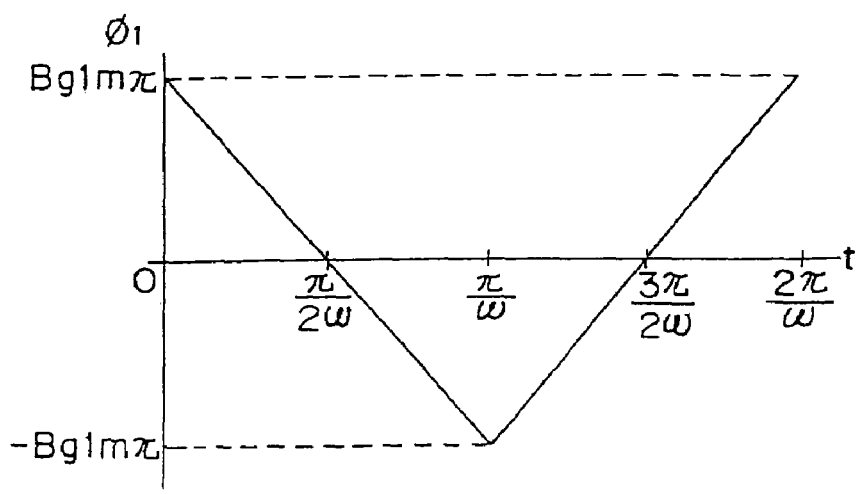
FIG. 9 is a chart showing the relation between the magnetic flux amount and time that is exhibited when the magnetic flux density distribution pattern represents the rectangular waveform.
Figure 10:
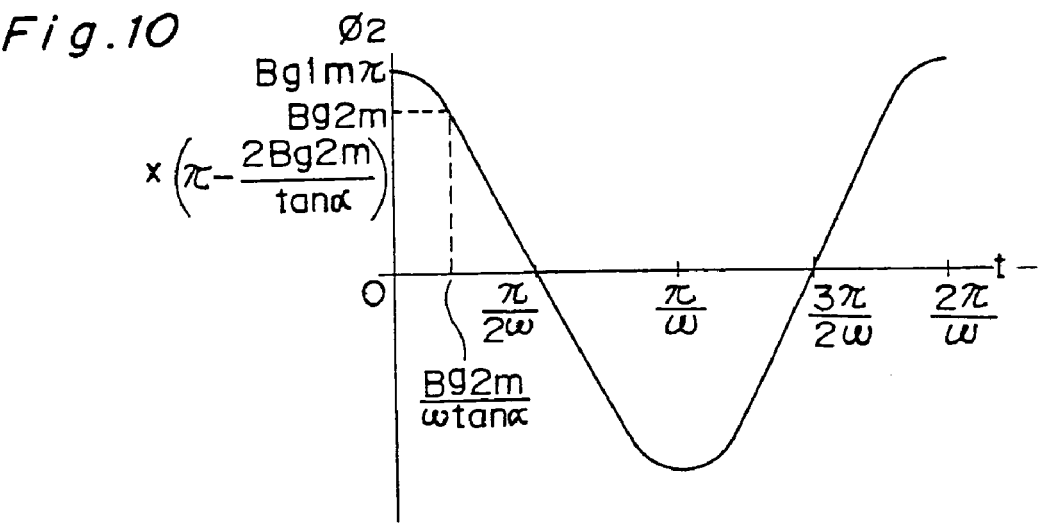
FIG. 10 is a chart showing the relation between the magnetic flux amount and time that is exhibited when the magnetic flux density distribution pattern represents the trapezoidal waveform.

The amount of the magnetic fluxes φ1(t) in the case where the pattern $Bg(\theta)$ of distribution of the magnetic flux densities in the air gap represents the rectangular waveform $Bg1(\theta)$ represents such a waveform as shown in FIG. 9 when $Bg1(\theta)$ of each of the equations (1) and (2) is substituted for $Bg(\theta)$ in the equation (7). The amount of the magnetic fluxed φ2(t) in the case of the trapezoidal waveform $Bg2(\theta)$ represents such a waveform as shown in FIG. 10 when $Bg1(\theta)$ in each of the equations (4) and (5) is substituted for $Bg(\theta)$ in the equation (7). The axis of ordinates and the axis of abscissas in each of FIGS. 9 and 10 represent the amount of the magnetic fluxes φ and the time t, respectively.

The waveform V(t) of the voltage induced across the stator winding can be expressed by the following equation:

$$V(t) = -n\frac{d}{dt}\int_{\omega t}^{\omega t+\pi} B_g(\theta)\, d\theta = -\omega n[B(\theta+\pi)-B(\theta)] \tag{8}$$

Figure 11:
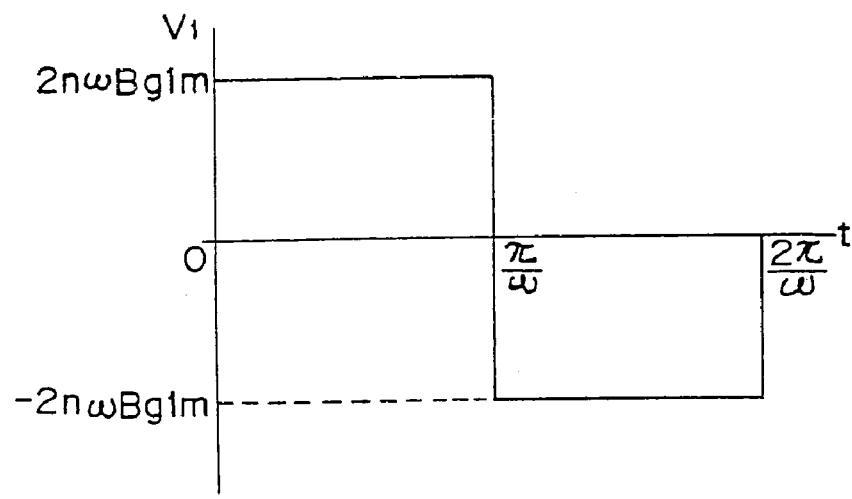
FIG. 11 is a chart showing the relation between the induced voltage and time that is exhibited when the magnetic flux density distribution pattern represents the rectangular waveform.
Figure 12:
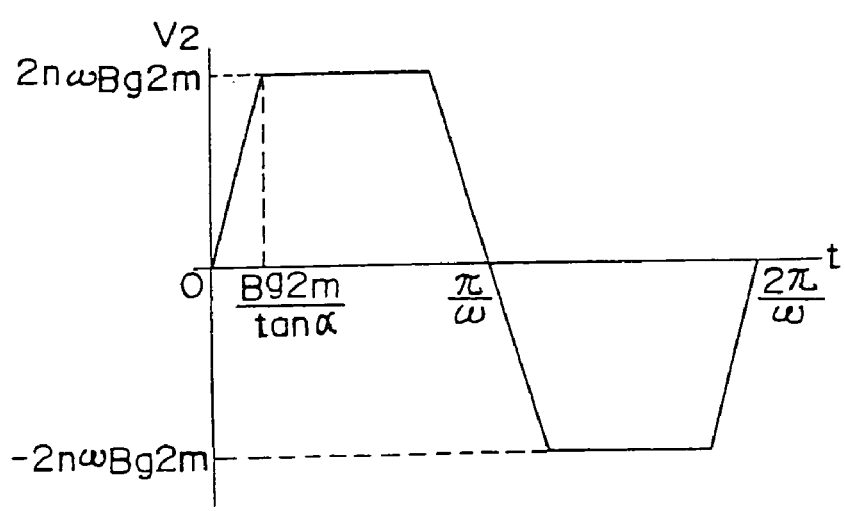
FIG. 12 is a chart showing the relation between the induced voltage and time that is exhibited when the magnetic flux density distribution pattern represents the trapezoidal waveform.

The waveform V1(t) of the induced voltage in the case where the pattern of distribution of the magnetic flux densities in the air gap represents the rectangular waveform Bg1(θ) and the waveform V2(t) of the induced voltage in the case where the pattern of distribution of the magnetic flux densities in the air gap represents the trapezoidal waveform Bg2(θ) are shown in FIGS. 11 and 12, respectively, in which the axis of ordinates represents the induced voltage V(t) and the axis of abscissas represents the time t.

The induced voltage V means an effective value of the induced voltage waveform and is expressed by the following equation:

$$V = \sqrt{\frac{1}{\pi}\int_0^\pi V^2(t)\,dt} \qquad (9)$$

Substituting the equation (8) for the equation (9) results in the induced voltage V that is expressed by the following equation (10):

$$V = \sqrt{\frac{\omega^2 n^2}{\pi}\int_0^\pi [B(\theta+\pi) - B(\theta)]^2\,d\theta} \qquad (10)$$

The induced voltage $V_1$ in the case where the pattern of distribution of the magnetic flux densities in the air gap represents the rectangular waveform Bg1(θ) can be expressed by the following equation by substituting the equations (1) and (2) for the equation (10):

$$V_1 = 2\omega n B_{g2m}\sqrt{1 - \frac{4B_{g2m}}{3\pi\tan\alpha}} \qquad (11)$$

The induced voltage $V_2$ in the case where the pattern of distribution of the magnetic flux densities in the air gap represents the trapezoidal waveform Bg2(θ) can be expressed by the following equation by substituting the equations (3) and (4) for the equation (10):

$$V_2 = 2\omega n B_{g2m}\sqrt{1 - \frac{4B_{g2m}}{3\pi\tan\alpha}} \qquad (12)$$

Figure 13:
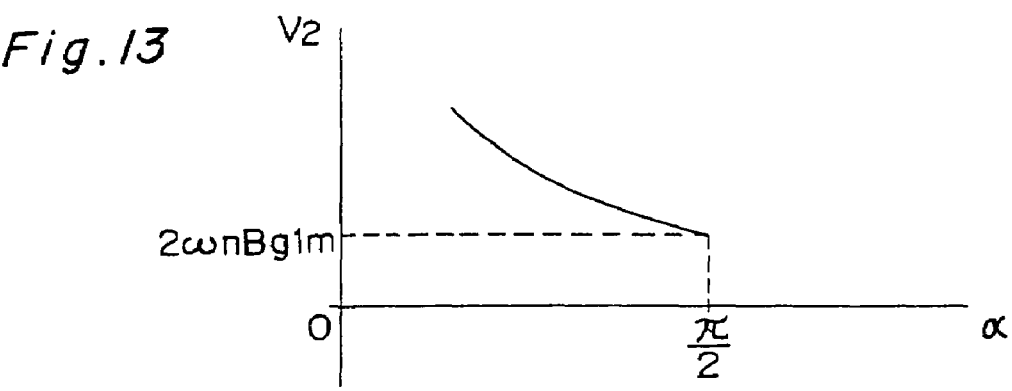
FIG. 13 is a chart showing the induced voltage versus angle α that is exhibited when the magnetic flux density distribution pattern represents the trapezoidal waveform.

$V_2$ is a function of the angle α shown in FIG. 8 and is shown in FIG. 13. When α=π/2, $V_2$ takes the same value as the equation (11) and it may be said that when α=π/2 in FIG. 13 the pattern of distribution of the magnetic flux densities in the air gap represents the induced voltage of the rectangular waveform. From FIG. 8, since the α is smaller than π/2 where the pattern of distribution of the magnetic flux densities in the air gap represents the trapezoidal waveform, it will readily be seen from FIG. 13 that the induced voltage where the pattern of distribution of the magnetic flux densities in the air gap represents the rectangular waveform is lower than that where the pattern of distribution of the magnetic flux densities represents the trapezoidal waveform.

The induced voltage where the pattern of distribution of the magnetic flux densities represents the sinusoidal waveform can be similarly expressed by the equation (9), and it can be said that the induced voltage where the pattern of distribution of the magnetic flux densities in the air gap represents the rectangular waveform is lower than that where the pattern of distribution of the magnetic flux densities represents the sinusoidal waveform. Accordingly, where the pattern of distribution of the magnetic flux densities represents the rectangular waveform, the out-of-step torque is reduced due to the fact that the rotor magnetic poles are weak and the efficiency will decrease because of increase of the electric current flowing through the stator winding. Therefore, to secure the required induced voltage; it is necessary to increase the size of the permanent magnets or to employ permanent magnets having a high residual magnetic flux density and, therefore, there has been a problem in that the cost for the permanent magnets is high, accompanied by increase in cost of the motor.

According to the illustrated embodiment of the present invention, however, the voltage induced across the stator winding can be increased by rendering the pattern of distribution of the magnetic flux densities in the air gap between the stator and the rotor to represent either the approximately trapezoidal waveform or the approximately sinusoidal waveform. Therefore, it is possible to provide the high-performance, inexpensive self-starting permanent magnet synchronous motor, with no need to increase the size of the permanent magnets, nor to employ the permanent magnets having a high residual magnetic flux density.

It is to be noted that although in the foregoing embodiment reference is made to the rotor of the synchronous motor employing the two poles, the present invention may not be limited thereto and may be equally applied to the rotor having, for example, four or more magnetic poles. Also, although the permanent magnets have been employed in the plate like form, the present invention is not limited thereto and the present invention is equally applicable to the rotor employing permanent magnets of, for example, an arcuate shape or any other suitable shape.

SECOND EMBODIMENT (FIG. 3)

Figure 3:
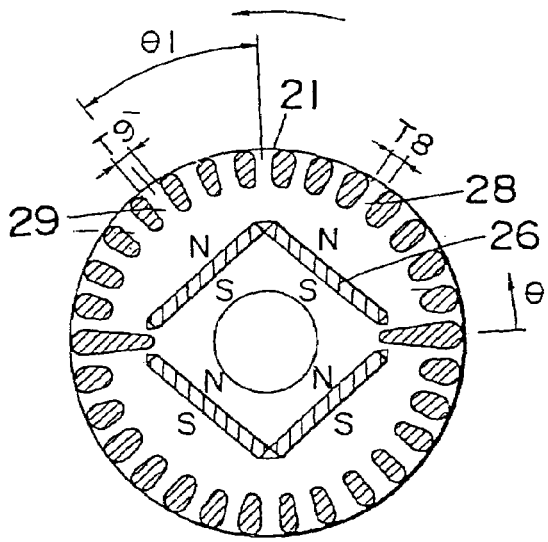
FIG. 3 is a transverse sectional view of the rotor used in the synchronous motor according to a second preferred embodiment of the present invention.

FIG. 3 illustrates a transverse sectional view of the rotor used in the self-starting permanent magnet synchronous motor according to a second preferred embodiment of the present invention. In FIG. 3, the rotor 21 is shown as rotating in a direction shown by the arrow. During a loaded operation, a composite magnetic flux of the magnetic flux emanating from the stator winding and the magnetic flux emanating from the permanent magnets 26 flows in a larger quantity in a portion 29 between the neighboring slots that are located on a leading side offset θ1 angularly in a direction conforming to the direction of rotation of the rotor, than that flowing in a portion 28 between the neighboring slots that are located on a trailing side from the center of the rotor magnetic poles with respect to the direction of rotation of the rotor. The size of that portion 29, that is, the spacing T8 between the neighboring slots on respective sides of that portion 29 is chosen to be larger than the spacing T9 between the neighboring slots on respective sides of that portion 28 and, therefore, it is possible to avoid magnetic saturation of the iron core at that portion 29 between the neighboring slots to thereby secure a favorable motor characteristic.

THIRD EMBODIMENT (FIG. 4)

Figure 4:
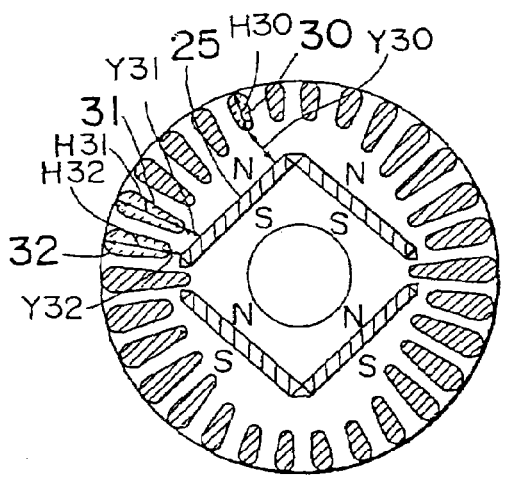
FIG. 4 is a transverse sectional view of the rotor used in the synchronous motor according to a third preferred embodiment of the present invention.

FIG. 4 illustrates a transverse sectional view of the rotor used in the self-starting permanent magnet synchronous motor according to a third preferred embodiment of the present invention. In FIG. 4, one of the slots that is identified by 30 is the slot positioned adjacent the center of the rotor magnetic poles, and the slots 31 and 32 are positioned adjacent one of opposite ends of the rotor magnetic poles. These slots 30, 31 and 32 have different radial lengths H30, H31 and H32, respectively, and the distances Y31 and Y32 between the slot 31 and the magnet retaining hole 25 and between the slot 32 and the magnet retaining hole 25 are chosen to be so smaller than the distance Y30 between the slot 30 and the magnet retaining hole 25 that the magnetic fluxes emanating from the permanent magnets will hardly leak to the outer peripheral surface of the rotor adjacent the ends of the rotor magnetic poles and will, instead, leak to the outer peripheral surface of the rotor adjacent the center of the rotor magnetic poles. For this reason, the pattern of distribution of the magnetic flux densities in the air gap between the stator and the rotor can represent the generally trapezoidal waveform or the generally sinusoidal waveform and, since the amount of change of the magnetic flux per unitary time is so large as compared with the rectangular waveform, the voltage induced across the stator winding can be increased. Accordingly, with no need to increase the volume of the permanent magnets or employ the permanent magnets having a high residual magnetic flux density in order to secure the required induced voltage such as implemented in the prior art, it is possible to provide the high-performance, inexpensive self-starting synchronous motor of the type employing the permanent magnets that can exhibit a required out-of-step torque and a high efficiency.

FOURTH EMBODIMENT (FIG. 5)

Figure 5:
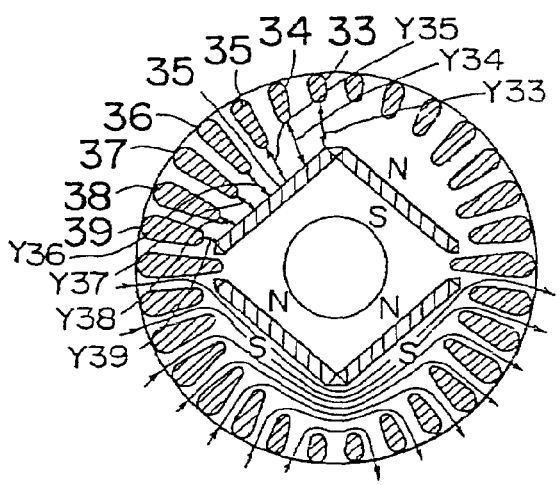
FIG. 5 is a transverse sectional view of the rotor used in the synchronous motor according to a fourth preferred embodiment of the present invention.
Figure 6:
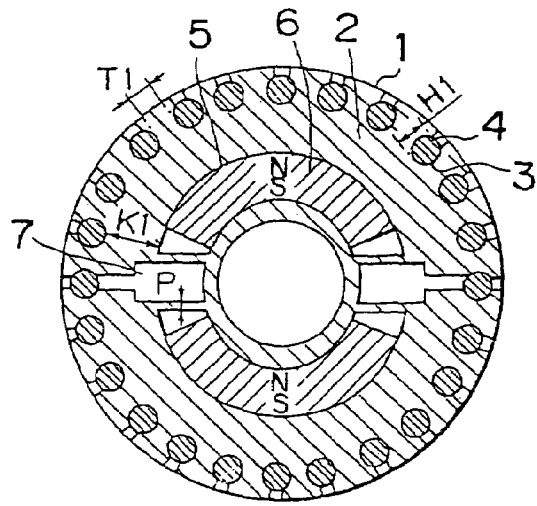
FIG. 6 is a transverse sectional view of the rotor used in the prior art self-starting synchronous motor of a kind utilizing permanent magnets.

FIG. 5 illustrates a transverse sectional view of the rotor used in the self-starting permanent magnet synchronous motor according to a fourth preferred embodiment of the present invention. In FIG. 5, the slots 33, 34, 35, 36, 37, 38 and 39 are those positioned in a region ranging from the center to one end of the rotor magnetic poles and are spaced progressively decreasing distances Y33, Y34, Y35, Y36, Y37, Y38 and Y39, respectively, from the magnet retaining hole 35.

Arrow-headed lines shown in FIG. 5 illustrate the manner in which the magnetic fluxes of the magnetic field formed by the stator winding run across the rotor 1. For simplification purpose, the pattern of flow of the magnetic fluxed is shown only in a lower half of the rotor and not shown in an upper half of the same. As can be seen from this figure, the amount of the magnetic fluxes from the stator is small at a portion between the slot 39 adjacent the end of the rotor magnetic poles and the magnet retaining hole, but increases as the center of the magnetic poles approaches because the magnetic fluxes flowing in between the slots overlap. Thus, at a location adjacent the center of the magnetic poles, the amount of the magnetic fluxes is maximized where the magnetic fluxes of the magnetic field developed by the stator winding are intensified.

However, since the distance between each of the slots and the magnet retaining hole as well progressively increases from the end of the rotor magnetic poles towards the center of the rotor magnetic poles, any possible magnetic saturation of an iron core portion between the slots and the magnet retaining hole can be prevented, thereby ensuring a favorable motor characteristic.

FIFTH EMBODIMENT (FIGS. 4 TO 7)

Figure 14:
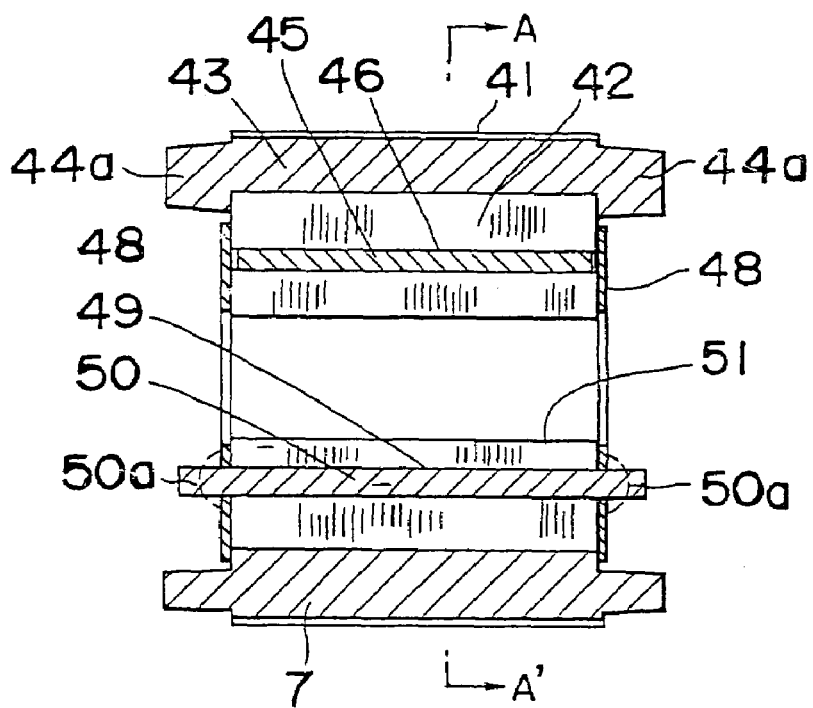
FIG. 14 is a longitudinal sectional view of a self-starting synchronous motor of a type utilizing permanent magnets according to a fifth preferred embodiment of the present invention.
Figure 16:
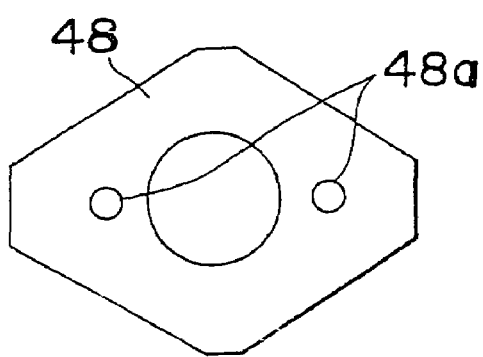
FIG. 16 is a plan view of an end plate of the rotor.
Figure 15:
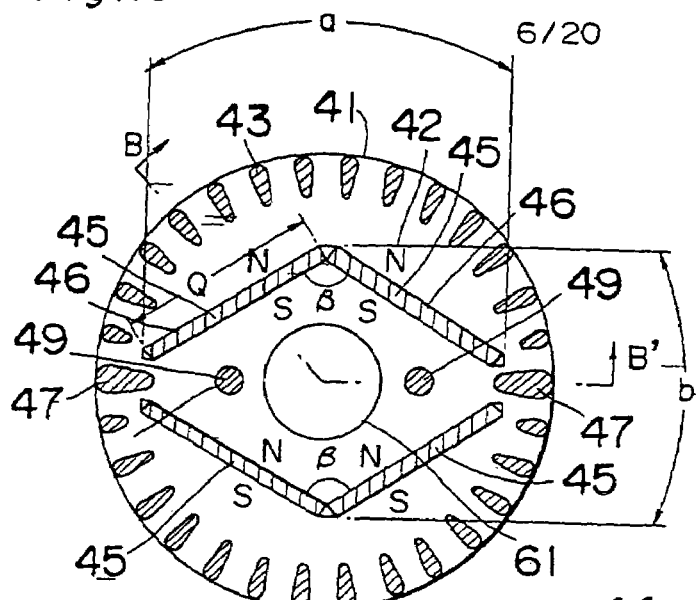
FIG. 15 is a transverse sectional view of the rotor used in the synchronous motor shown in FIG. 14.
Figure 17:
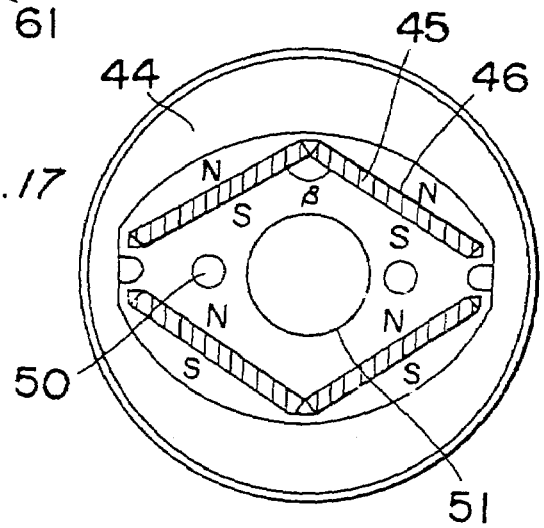
FIG. 17 is an end view of the rotor.

FIG. 14 is a longitudinal sectional view of the self-starting synchronous motor of a type utilizing permanent magnets according to a fifth preferred embodiment of the present invention, and FIG. 15 is a cross-sectional view taken along the line A–A' in FIG. 14. FIG. 16 is a plan view of an end plate made of a non-magnetizable material and used for protection of the permanent magnets. FIG. 17 is an end view of the rotor after the permanent magnets have been inserted and arranged, but before the end plate is fixed to the rotor.

In these figures, reference numeral 41 represents a rotor, and reference numeral 42 represents a rotor iron core in the form of a laminated structure of electromagnetic steel plates. Reference numeral 43 represents conductor bars molded together with shortcircuit rings 44 positioned on respective ends of the conductor bars by means of an aluminum die casting technique to provide a starter squirrel cage conductor. Reference numeral 5 represents permanent magnets each having a width Q. Reference numeral 46 represents magnet retaining holes defined in the rotor iron core 42 for accommodating therein the permanent magnets. After the aluminum die casting, two plate-like permanent magnets 45 of the same polarity are butted end-to-end in a generally V-shaped configuration to form a single rotor magnetic pole and, since four permanent magnets 45e employed in the rotor, two rotor magnetic poles are formed.

Reference numeral 47 represents a barrier for preventing a shortcircuit of the magnetic fluxes developed between the neighboring permanent magnets of different polarities, which is also filled in position by means of the aluminum die casting. Reference numeral 48 represents end plates made of a non-magnetizable material and used to protect the permanent magnets, each being formed with an engagement hole 48a. Reference numeral 49 represents axial holes defined in the rotor iron core 42 so as to extend axially thereof, which holes are filled with aluminum 50 that is used during the aluminum die casting to form the starter squirrel cage conductor. The aluminum 50 filling up the axial holes 49 protrudes axially outwardly from the opposite ends of the rotor iron core 42 to thereby define projections 50a as best shown in FIG. 14. The end plates 48 are, after the projections 50a have been passed through the associated engagement holes 48a in the end plates 48, fixed to the opposite end faces of the rotor iron core 42 by crimping or staking the projections 50a to enlarge as shown by broken lines in FIG. 14. Reference numeral 51 represents a bearing hole defined in the rotor iron core 42.

The amount of the magnetic fluxes of the permanent magnets 45 that can be obtained from the rotor is substantially proportional to the product of the width Q of the permanent magnets 45 times the length of the permanent magnets 45 as measured in the axial direction of the rotor, that is, the area of magnetic poles of the permanent magnets 45.

It is to be noted that although in the foregoing description the permanent magnets which have been magnetized are inserted and arranged, the rotor magnetic poles may be equally formed by inserting and arranging permanent magnets, which have not yet been magnetized, in the rotor iron core to complete the rotor and then polarizing the permanent magnets with the use of a magnetizing apparatus.

Figure 25:
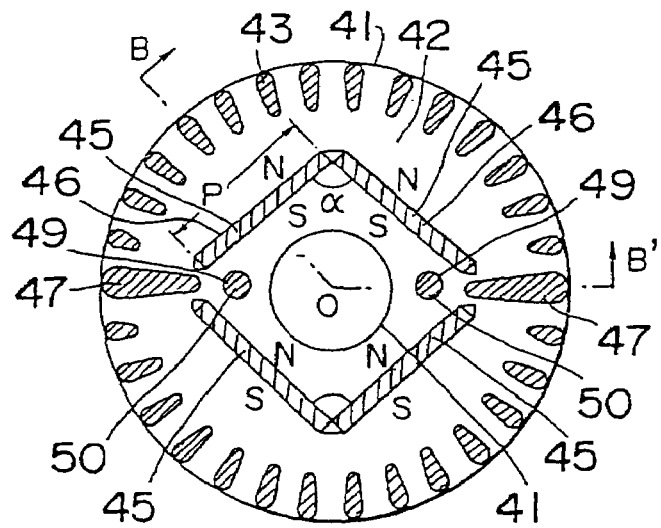
FIG. 25 is a transverse sectional view of the prior art rotor.

According to the fifth embodiment of the present invention, the angle β of end-to-end abutment of the same poles of the permanent magnets 45 is chosen to be larger than the angle α in the prior art that is 90° as shown in FIG. 25, and the width Q of each permanent magnet 45 as measured in a direction perpendicular to the longitudinal axis thereof is enlarged to a value larger than the width P in the prior art as shown in FIG. 25. Increase of the angle of end-to-end abutment of the permanent magnets and selection of the inner radial dimension c at a location adjacent the end of the rotor magnetic poles to be larger than the inner radial dimension b at a location adjacent the center of the rotor magnetic poles is effective to allow the permanent magnets of the increased width to be employed. In correspondence with the increase of the angle of end-to-end abutment of the permanent magnets 45 and increase of the width of the permanent magnets 45, each of the shortcircuit rings 44 employed in the present invention is not round in shape such as used in the prior art, but of a generally rhombic shape, as shown in FIG. 14, having its outer contour positioned outwardly of the magnet retaining holes 46 and allowing an inner diameter of the ends of the rotor magnetic poles to be greater than that of the center of the rotor magnetic poles.

The reason that the inner diameter of each of the shortcircuit rings 44a is not chosen to be round in conformity with the inner diameter at the end of the magnetic poles of the total peripheral rotor is that, if it is so chosen, the equivalent sectional surface area of each shortcircuit ring A as a whole of 44a will become so excessively small as to increase the resistance, resulting in reduction in starting capability of the motor.

As discussed above, according to the fifth embodiment of the present invention, since the permanent magnets 45 can have an increased area of surface of the magnetic poles, the amount of the magnetic fluxes of the permanent magnets required by the motor can be obtained.

SIXTH EMBODIMENT (FIGS. 18 AND 19)

Figure 18:
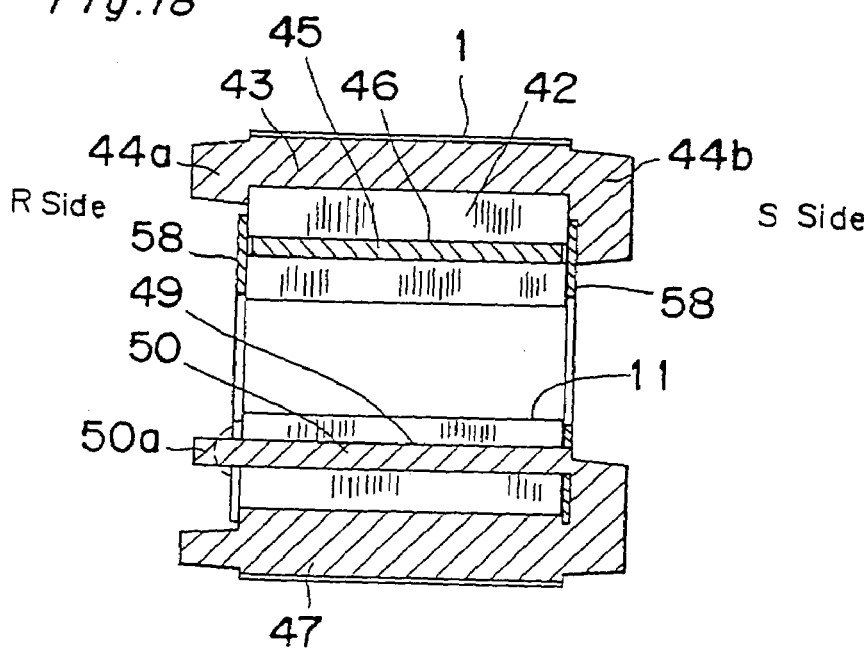
FIG. 18 is a longitudinal sectional view of the self-starting permanent magnet synchronous motor according to a sixth preferred embodiment of the present invention.
Figure 19:
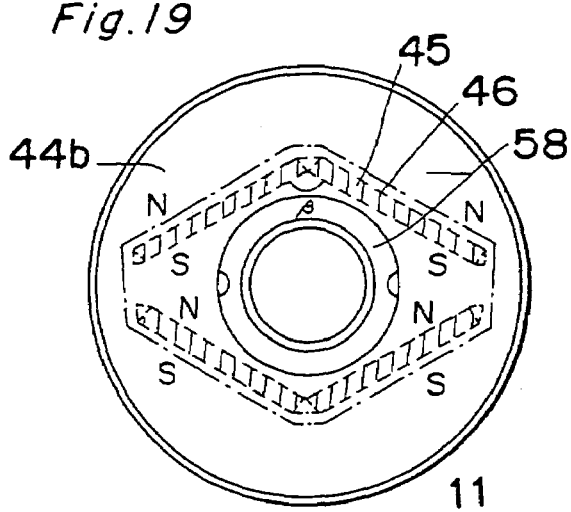
FIG. 19 is an end view of the rotor used in the synchronous motor of FIG. 18.

A sixth preferred embodiment of the present invention will now be described with reference to FIGS. 18 and 19., wherein FIG. 18 is a longitudinal sectional view of the self-starting synchronous motor of a type utilizing permanent magnets according to the sixth embodiment of the present invention and FIG. 19 is an end view as viewed from an S side in FIG. 18. In FIG. 19, broken lines show the position of magnet retaining holes 46 and single-dotted lines show an outer contour of the end plate 58. Although an end view of the rotor as viewed from an R side is not shown, the width and the angle of end-to-end abutments of the permanent magnets 45 and the inner diametric shape of the shortcircuit ring A of 44a are all similar to those in the previously described first embodiment of the present invention, and the shortcircuit ring B of 44b on the opposite S side has an inner diameter that is round and is so chosen to be small as to allow it to be positioned inwardly of the magnet retaining holes 46.

Referring to FIGS. 18 and 19, the end plate 58 is similarly arranged in abutment with an end face of the rotor iron core 42 on the S side and is of a shape sufficient to encompass the magnet retaining holes 46 and, accordingly, there is no possibility that the die cast aluminum may leak into the magnet retaining holes 46 which would otherwise render it difficult to insert the permanent magnets 45.

SEVENTH EMBODIMENT (FIGS. 20 TO 22)

Figure 21:
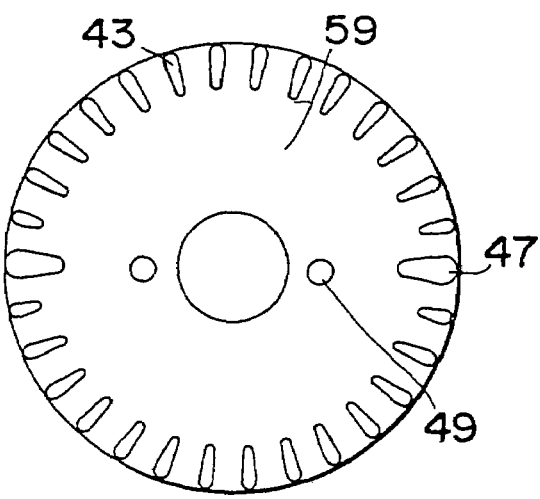
FIG. 21 is an end view of an electromagnetic steel plate at one end of a rotor iron core employed in the synchronous motor of FIG. 20.
Figure 20:
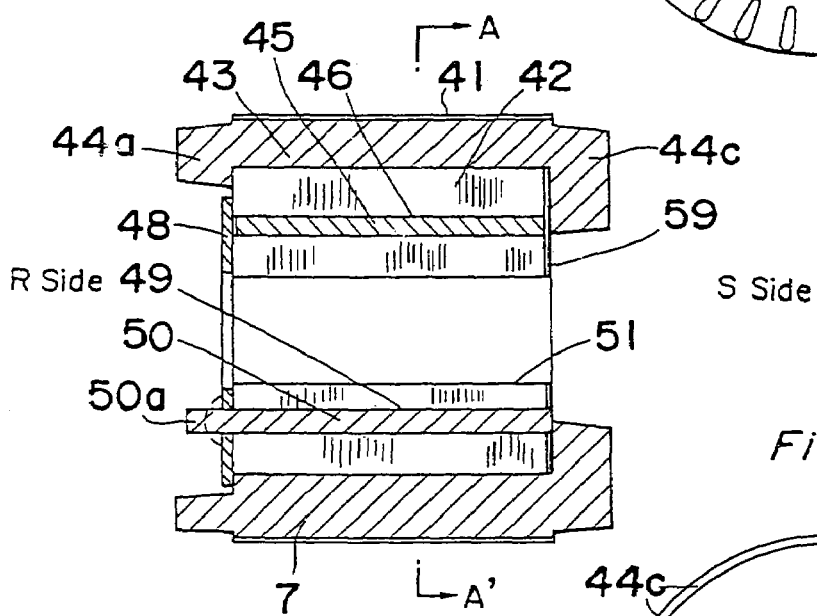
FIG. 20 is a longitudinal sectional view of the self-starting permanent magnet synchronous motor according to a seventh preferred embodiment of the present invention.
Figure 22:
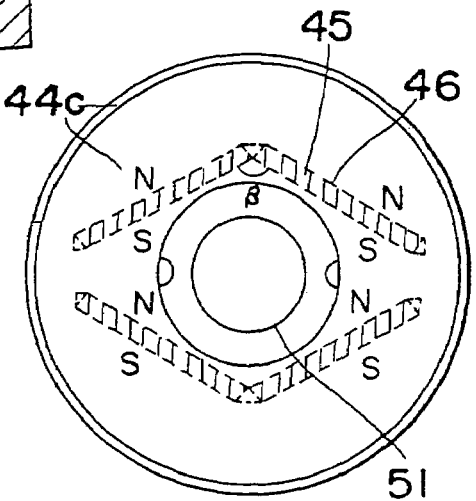
FIG. 22 is an end view of the rotor used in the synchronous motor of FIG. 20.

A seventh preferred embodiment of the present invention will now be described with reference to FIGS. 20 to 22. FIG. 20 is a longitudinal sectional view of the self-starting synchronous motor of a type utilizing permanent magnets according to the seventh embodiment of the present invention, FIG. 21 is a plan view of one or a plurality of electromagnetic steel plates 59 at one end on the S side of the rotor iron core 2, and FIG. 22 is an end view as viewed from the S side. Although an end view of the rotor as viewed from the R side is not shown, the width and the angle of end-to-end abutments of the permanent magnets 45 and the inner diametric shape of the shortcircuit ring A of 44a are all similar to those in the previously described fifth embodiment of the present invention.

Referring to FIGS. 20 to 22, the shortcircuit ring C of 44c on the S side has its inner diameter or bore which is round and is so chosen as to be positioned inwardly of the magnet retaining holes 46. One or a plurality of electromagnetic steel plates 59 at the end on the S side of the rotor iron core 42 is provided with slots of the same shape and size defined at the same position as the electromagnetic steel plates other than those at the end, but no magnetic retaining hole 46 is provided. Accordingly, even though the inner diameter of the shortcircuit ring C of 44c is small, there is no possibility that the die cast aluminum will leak into the magnet retaining holes 46 to render it to be difficult to insert the permanent magnets.

EIGHTH EMBODIMENT (FIG. 23)

An eighth embodiment of the present invention will be described with reference to FIG. 23 which is an end view of the rotor as viewed in a direction conforming to the direction of insertion of permanent magnets 45, showing the rotor after the permanent magnets 45 have been inserted and arranged, but before the end plate is mounted.

Figure 23:
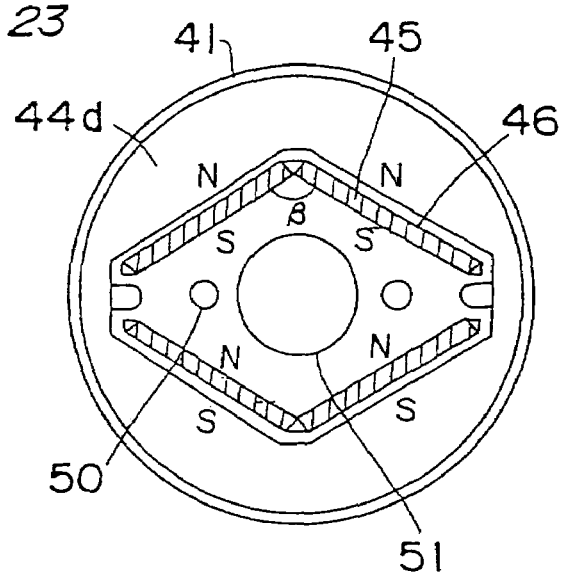
FIG. 23 is an end view of the rotor used in the self-starting permanent magnet synchronous motor according to an eighth preferred embodiment of the present invention.

Referring to FIG. 23, the inner diameter or bore of the shortcircuit ring D of 44d is of a shape conforming to and extending along the magnet retaining holes 46. This design permits the permanent magnets 45 to be inserted along a wall surface inside the inner diameter or bore of the shortcircuit ring D of 44d, thereby facilitating a job of insertion of the permanent magnets to thereby increase the ease to assembly.

NINTH EMBODIMENT (FIG. 24)

Figure 24:
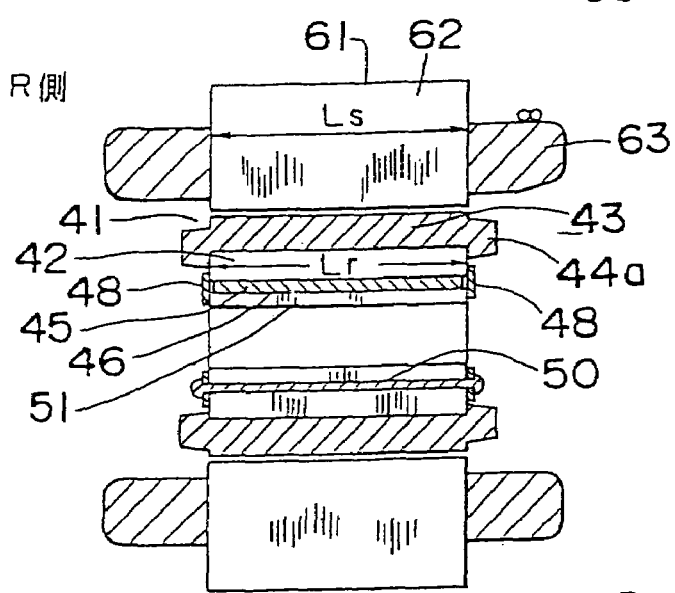
FIG. 24 is a longitudinal sectional view of the self-starting permanent magnet synchronous motor according to a ninth preferred embodiment of the present invention.

A ninth preferred embodiment of the present invention will be described with reference to FIG. 24 and also to FIG. 17 used in connection with the fifth embodiment of the present invention. FIG. 24 illustrates a transverse sectional view of the self-starting synchronous motor of the type employing the permanent magnets according to the ninth embodiment of the present invention. In this figure, reference numeral 61 represents a stator, and reference numeral 62 represents a stator iron core in the form of a laminate structure of electromagnetic steel plates, which laminate structure has a laminate thickness indicated by Ls. Reference numeral 63 represents a stator winding wound around the stator iron core 62. The rotor 41 employed therein is substantially identical with that described in connection with the fifth embodiment with preference to FIG. 17 and are not therefore described for the sake of brevity. However, as is the case with the rotor shown in FIG. 17, by increasing the width of the permanent magnets 45 as measured in a direction perpendicular to the longitudinal axis thereof to thereby increase the area of surface of the magnetic poles of the permanent magnets 45 to increase the amount of the magnetic fluxes emanating from the permanent magnets 45, and also by designing the inner diameter or bore of the shortcircuit ring A of 44a to be positioned outwardly of the magnet retaining holes 46 and, again by selecting the inner radial dimension adjacent the end of the rotor magnetic poles of the shortcircuit ring A of 44a to be larger than that adjacent the center of the rotor magnetic poles, the laminate thickness of the electromagnetic steel plates forming the rotor iron core 42 can advantageously reduced to a value substantially equal to the laminate thickness Ls of the stator iron core.

The motor of the type utilizing the permanent magnets is generally designed by selecting the axial length of the permanent magnets to be greater than the laminate thickness of the stator iron core so that portions of the magnetic fluxes of the permanent magnets, which emerge outwardly from the opposite ends of the stator iron core, can flow inwardly of the stator iron core from the opposite ends thereof to thereby increase the amount of the magnetic fluxes that runs through the whole of the stator iron core and, for that purpose, the laminate thickness of the rotor iron core is chosen to be greater than the laminate thickness of the stator iron core. In contrast thereto, according to the ninth embodiment of the present invention, the design has been employed as hereinabove described to render the laminate thickness Ls of the stator iron core and the laminate thickness $L_R$ of the rotor iron core to be substantially equal to each other.

In view of the foregoing, the number of the electromagnetic steel plates for each of the stator and rotor iron cores that are simultaneously blanked within the same dies is substantially equal for the both and, therefore, production of surplus electromagnetic steel plates can be suppressed to thereby reduce the cost.

TENTH EMBODIMENT (FIGS. 26 TO 28)

Figure 26:
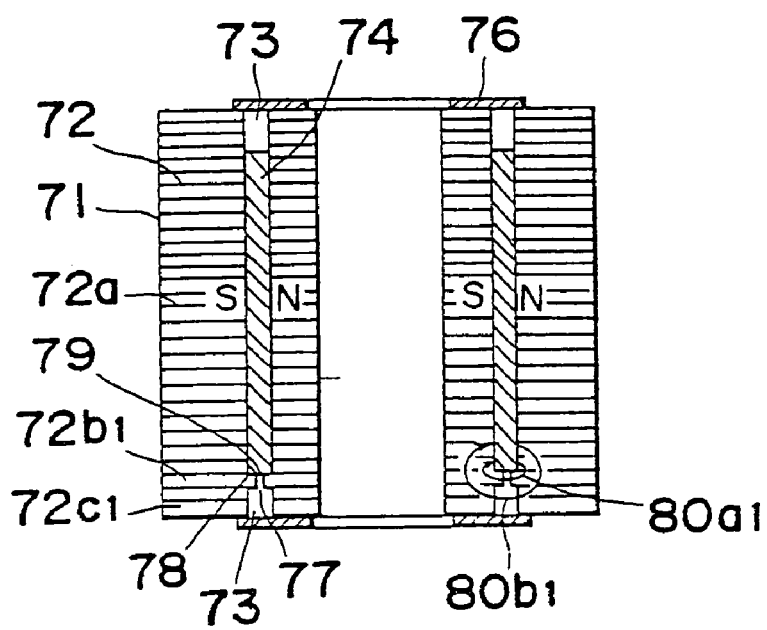
FIG. 26 is a longitudinal sectional view of the rotor used in the synchronous motor according to a tenth preferred embodiment of the present invention.
Figure 27:
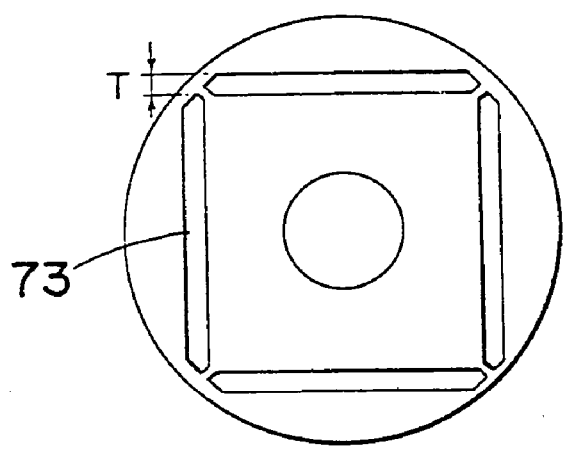
FIG. 27 is a plan view of a rotor iron plate E.

A tenth preferred embodiment of the present invention will now be described with reference to FIGS. 26 to 28. FIG. 26 is a longitudinal sectional view of the rotor used in the synchronous motor according to the tenth embodiment of the present invention. In FIG. 26, reference numeral 71 represents a rotor, and reference numeral 72 represents a rotor iron core. Reference numeral 72a represents a rotor iron core formed by laminating rotor iron plates E, and one of the rotor iron plates E is shown in FIG. 27. In FIG. 27, reference numeral 73 represents magnet retaining holes, and when the rotor iron plates E are laminated, the magnet retaining holes 73 are axially aligned with each other as shown in FIG. 26 with the respective permanent magnets 74 subsequently embedded therein.

Figure 28:
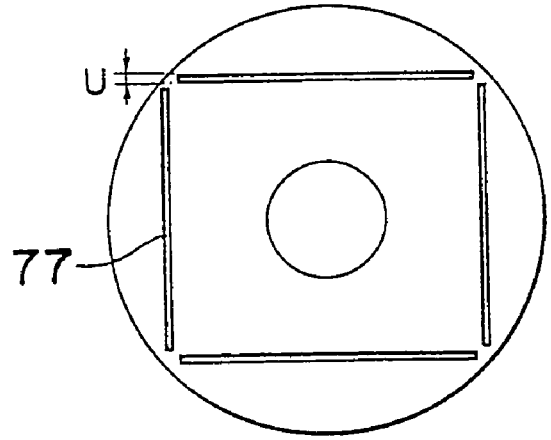
FIG. 28 is a plan view of a rotor iron plate F.

Reference numeral 72b1 shown in FIG. 26 represents a rotor iron core formed by laminating rotor iron plates F to an axial end face of the rotor iron core 72a, one of the rotor iron plates F being shown in FIG. 28 in a plan view. In FIG. 28, reference numeral 77 represents magnetic flux shortcircuit preventive holes that are arranged at the same position as the magnet retaining holes 73 in the rotor iron plates E, but have a width U smaller than the width T of the magnet retaining holes 73. When the rotor iron plates F are laminated to the axial end face of the rotor iron core 72a, the magnetic flux shortcircuit preventive holes 77 are axially communicated with the magnet retaining holes 73 as shown in FIG. 26. In FIG. 26, reference numeral 72c1 represents a rotor iron core made of one or more rotor iron plates E laminated to the axial end face of the rotor iron core 72b1. Also, in FIG. 26, reference numeral 76 represents an end plate made of a non-magnetizable material and having a shape sufficient to overlay the magnet retaining holes 73 and the magnetic flux shortcircuit preventive holes 77 so as to prevent debris of the permanent magnets 74, which would be generated at the time the permanent magnets 74 are inserted in and embedded in the magnet retaining holes 73, from flowing outwardly and also to prevent external foreign matter from being trapped into the magnet retaining holes 73.

As shown in FIG. 26, an axial end face 79 of each of the permanent magnets 79 is held in engagement with an outer peripheral edge 78 of the respective magnetic flux shortcircuit preventive hole 77 on an abutment face of the rotor iron core 72b1 that is in engagement with the rotor iron cores 72a and, accordingly, magnetic fluxes 80 leaking between N and S poles at the respective opposite ends of the permanent magnets 74 run from the rotor iron cores 72a back to the permanent magnets 74 through the rotor iron core 72b1, then across the magnetic flux shortcircuit preventive holes 77 and finally through the rotor iron cores 72b1 and 72a. The leaking magnetic fluxes 80b1 runs from the rotor iron cores 72a back to the permanent magnets 74 through the rotor iron core 72b1, then through the rotor iron core 72c1, across the magnet retaining holes 73, again through the rotor iron core 72c1, the rotor iron core 72b1 and finally through the rotor iron core 72a. Where the rotor iron core 72b1 is made up of a single rotor iron plate or a plurality of rotor iron plates F in a number as small as possible so long as the permanent magnets can be positioned, a magnetic circuit through which the leaking magnetic fluxes 80a1 run can have a magnetic resistance of a magnitude sufficient to minimize the leaking magnetic fluxes 80a1. Also, since the width T of the magnet retaining holes 73 in the rotor iron plate E forming the rotor iron core 72c1 is so larger than the width U of the magnetic flux shortcircuit preventive hole 77 in the rotor iron plate F that, as compared with the case in which the rotor iron core 72c1 is prepared from the rotor iron plate F, the magnetic circuit through which the leaking magnetic fluxes 80b1 run can have a magnetic resistance of a magnitude sufficient to minimize the leaking magnetic fluxes 80b1. Therefore, the motor characteristic can be increased.

Also, since the permanent magnets 74 attracts and is therefore held in engagement with the outer peripheral edge 78 of the magnetic flux shortcircuit preventive hole 77 in the rotor iron core 72b1, the permanent magnets 74 can be accurately positioned with respect to the axial direction thereof only by means of the rotor iron cores 72 with no holder employed, thereby reducing the cost for assembly and component parts.

It is to be noted that the number of the rotor iron plates F laminated is so chosen that a point intermediate of the axial length of the rotor iron cores 72 can match with a point intermediate of the axial length of the permanent magnets 74, and this equally applies to any one of the embodiments of the present invention that follow.

It is also to be noted that where the permanent magnets are made of a rare earth metal of, for example, Nd—Fe—B system, since the magnet made of the rare earth metal of the Nd—Fe—B system is known to exhibit a high residual magnetic flux density, the volume of the rotor and the motor as a whole can advantageously be reduced.

In describing the tenth embodiment of the present invention, the permanent magnets has been employed in the form of a generally plate-like configuration, but the present invention may not be limited thereto and can be equally applied to the rotor employing the permanent magnets of any suitable shape such as, for example, an arcuate shape.

ELEVENTH EMBODIMENT (FIGS. 29 AND 30)

Figure 29:
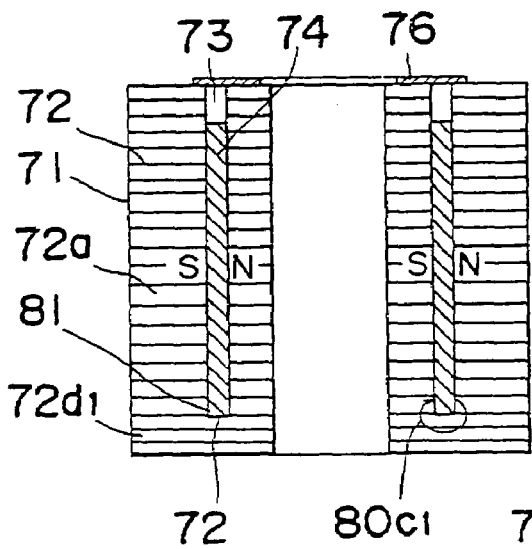
FIG. 29 is a longitudinal sectional view of the rotor used in the synchronous motor according to an eleventh preferred embodiment of the present invention.
Figure 30:
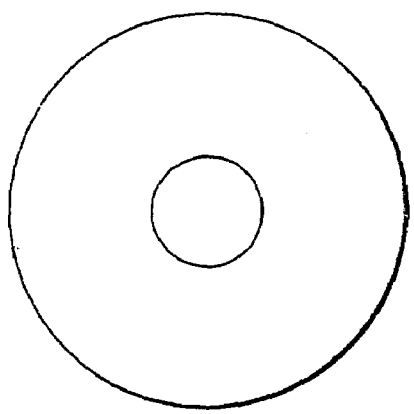
FIG. 30 is a plan view of the rotor iron plate G.

An eleventh preferred embodiment of the present invention will be described with reference to FIGS. 29 and 30, wherein FIG. 29 is a longitudinal sectional view of the rotor used in the synchronous motor and FIG. 30 is a plan view of the rotor iron plate G. As shown in. FIG. 29, reference numeral 72d1 represents a rotor iron core comprising a rotor iron core 72a having its axial end face to which rotor iron plates G are laminated. Since the rotor iron plates G have no magnet retaining hole defined therein, lamination of the rotor iron plates G to the axial end face of the rotor iron core 72a results closure of the magnet retaining holes 73.

Since the axial end face 81 of the permanent magnets 74 is held in engagement with an abutment face of the rotor iron core 72d1 that is held in engagement with the rotor iron core 72a, magnetic fluxes 80c1 leaking from the axial end of the permanent magnets 74 runs from the rotor iron core 72a back to the permanent magnets 74 through the rotor iron core 72d1 and then through the rotor iron core 72a. Also, since the permanent magnets 74 attract and are therefore held in engagement with the axial end face 82 of the rotor iron core 72d1, the permanent magnets 74 can be accurately positioned with respect to the axial direction thereof with no need to use any holder, thereby reducing the cost for assembly and component parts.

Also, since the magnet retaining holes 73 in the rotor iron core 72a are closed at one end by the rotor iron core 72d1, positioning of a single end plate 76 at the opposite end is sufficient to close the opposite ends of the magnet retaining holes 73. While in the previously described tenth embodiment of the present invention, two end plates 76 are required, the eleventh embodiment requires the only end plate 6 and, therefore, the cost for assembly and component parts can further be reduced.

The rotor iron plate E and the rotor iron plate G can easily manufactured by controlling loading and unloading of blanking dies, that are used to form the magnet retaining hole 73, during a blanking process. Therefore, no blanking dies that are required in the previously described tenth embodiment of the present invention to form the magnetic flux shortcircuit preventive hole 77 in the rotor iron plate F is needed, making it possible to simplify the structure of the dies themselves.

TWELFTH EMBODIMENT (FIG. 31)

Figure 31:
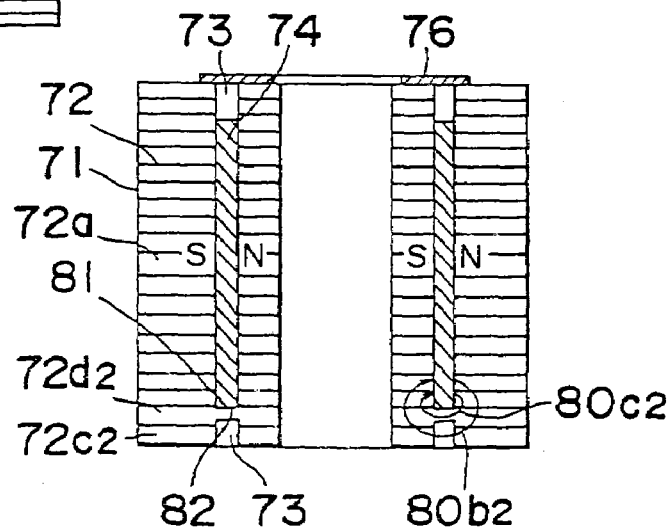
FIG. 31 is a longitudinal sectional view of the rotor used in the synchronous motor according to a twelfth preferred embodiment of the present invention.

FIG. 31 illustrates a longitudinal sectional view of the rotor used in the synchronous motor according to a twelfth embodiment of the present invention. An axial end face of the rotor iron core 72d2 opposite to that with which the axial end face 81 of the permanent magnets 74 are held in engagement is provided with a rotor iron core 72c2 of a laminated structure including rotor iron plates E.

Since the axial end face 81 of the permanent magnet 74 is held in engagement with the axial end face 82 of the rotor iron core 72d2, magnetic fluxes 80c2 leaking at the axial end of the permanent magnet 74 run from the rotor iron core 72a back to the permanent magnet 74 through the rotation core 72d2 and then through the rotor iron core 72a. The leaking magnetic fluxes 80b2 runs from the rotor iron cores 72a back to the permanent magnet 74 through the rotor iron core 72d2, then through the rotor iron core 72c2, across the magnet retaining holes 73, again through the rotor iron core 72c2, the rotor iron core 72d2 and finally through the rotor iron core 72a.

Since the leaking magnetic fluxes 80c1 traverse the magnet retaining holes 73, as compared with the magnetic resistance of the magnetic circuit through which the leaking magnetic fluxes 80c1 run in the previously described eleventh embodiment of the present invention, the magnetic circuit through which the leaking magnetic fluxes 80b2 run in this twelfth embodiment has a relatively high magnetic resistance and, therefore, the sum of the leaking magnetic fluxes 80c2 and 80b2 in this twelfth embodiment is smaller relative to the leaking magnetic fluxes 80c1 in the previously described eleventh embodiment. Accordingly, since the leaking magnetic fluxes can be reduced as compared with that in the previously described embodiment, the motor characteristic can be increased.

THIRTEENTH EMBODIMENT (FIGS. 32 TO 34)

Figure 32:
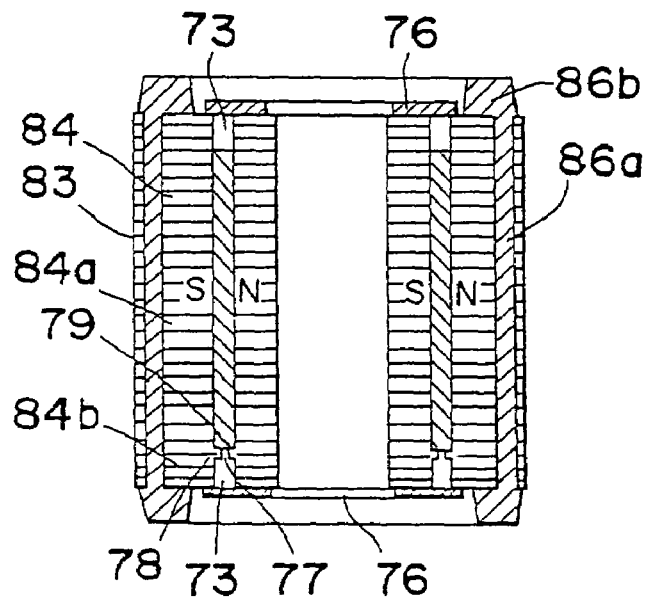
FIG. 32 is a longitudinal sectional view of the rotor used in the synchronous motor according to a thirteenth preferred embodiment of the present invention.

A thirteenth preferred embodiment of the present invention will be described with reference to FIGS. 32 to 34. FIG. 32 illustrates a longitudinal sectional view of the rotor used in the synchronous motor according to the thirteenth embodiment of the present invention. In this figure, reference numeral 83 represents a rotor and reference numeral 84 represents a rotor iron core. Reference numeral 84a represents a rotor iron core made up of a laminate of rotor iron plates H. Reference numeral 84b represents a rotor iron core made up of a laminate of rotor iron plates I, one of which is shown in FIG. 34 in a plan view.

Figure 33:
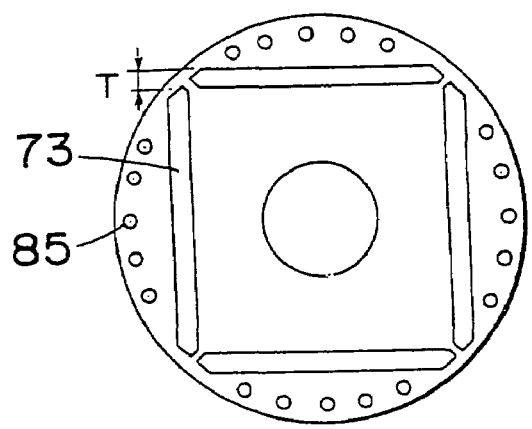
FIG. 33 is a plan view of the rotor iron plate H.

FIG. 33 illustrates a plan view of the rotor iron plate H. In this figure, reference numeral 85 represents a plurality of slots for accommodating conductor bars 86a of the starter squirrel cage conductor, and reference numeral 73 represents magnet retaining holes.

Figure 34:
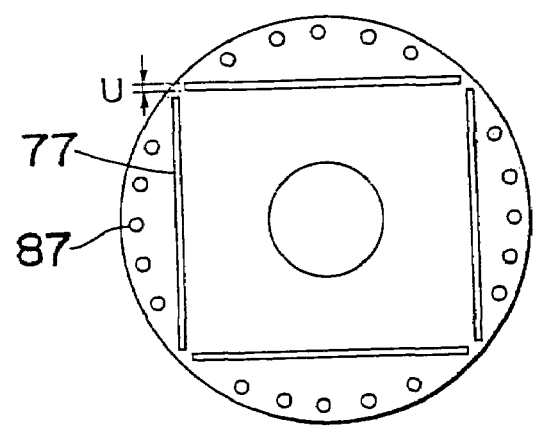
FIG. 34 is a plan view of the rotor iron plate I.

Referring to FIG. 34, reference numeral 87 represents a plurality of slots for accommodating the conductor bars 86a of the starter squirrel cage conductor shown in FIG. 32, which slots 86a are of the same shape as the slots 85 in the rotor iron plate H and are positioned at the same position as the slots 85 in the rotor iron plate H. Reference numeral 77 represents magnetic flux shortcircuit preventive holes that are positioned at the same position as the magnet retaining holes 73 in the rotor iron plate H of FIG. 33, but have a width U smaller than the width T of the magnet retaining holes 73.

Referring back to FIG. 32, reference numeral 84c represents a rotor iron core made up of one rotor iron plate E or a laminate of rotor iron plates E. By the use of any known aluminum die casting technique, the conductor bars 86a and shortcircuit rings 86b are formed integrally together to define the starter squirrel cage conductor. By arranging the starter squirrel cage conductor in the rotor 83, the self-starting synchronous motor of the type employing the permanent magnets can be obtained which operates as an inductor motor at the time of starting thereof and as a synchronous motor entrained by a synchronous speed upon arrival at the synchronous speed. Even in this case, since as is the case with the previously described tenth embodiment of the present invention, the rotor iron core 84b having the magnetic flux shortcircuit preventive holes 77 defined therein are employed and the rotor iron plates E are laminated, the leaking magnetic fluxes between the N and S poles at the axially opposite ends of the permanent magnets 74 can be reduced, thereby increasing the motor characteristic.

Even in the self-starting synchronous motor of the type employing the permanent magnets in which the starter squirrel cage conductor is arranged such as in this thirteenth embodiment, the permanent magnets 74 can be accurately positioned only by the rotor iron core 84 with no need to employ any holder and, therefore, the cost for assembly and component parts can be reduced advantageously.

FOURTEENTH EMBODIMENT (FIGS. 35 TO 37)

Figure 35:
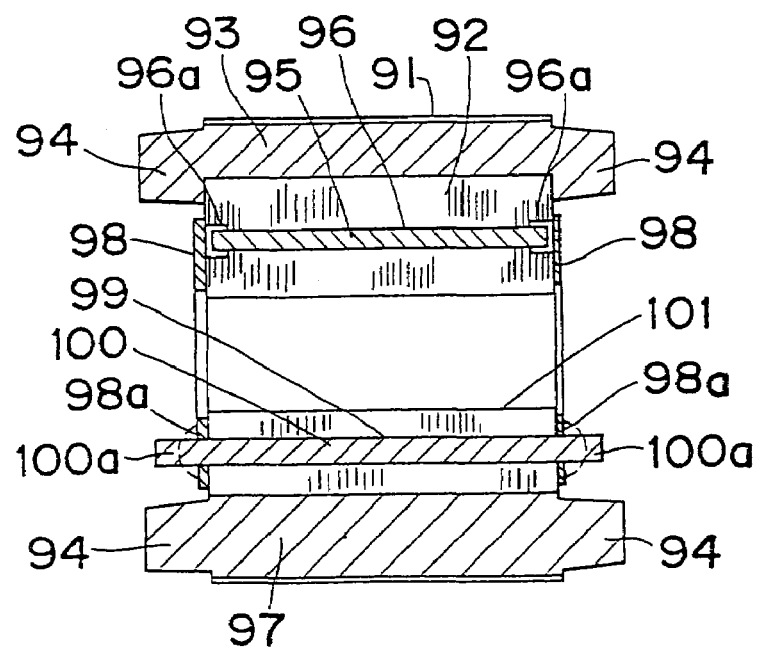
FIG. 35 is a longitudinal sectional view of the rotor used in the self-starting permanent magnet synchronous motor according to a fourteenth preferred embodiment of the present invention.
Figure 36:
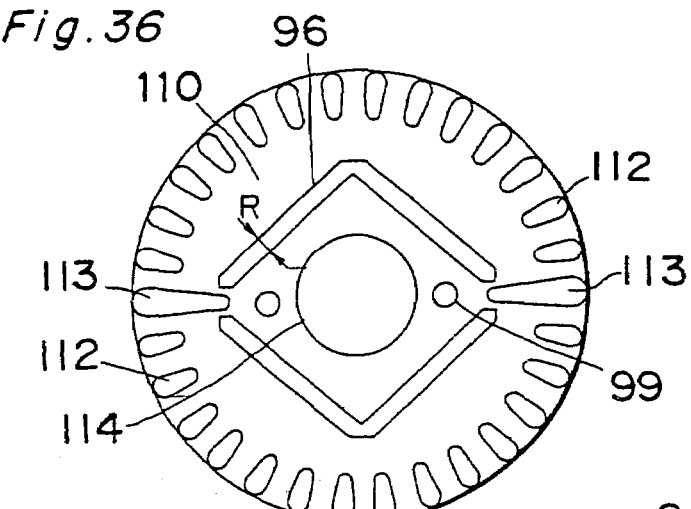
FIG. 36 is a plan view of the electromagnetic steel plate J in the rotor iron core employed in the synchronous motor of FIG. 35.
Figure 37:
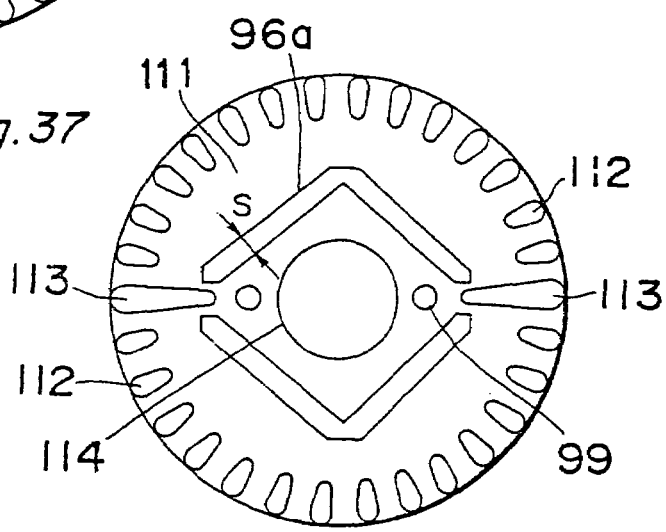
FIG. 37 is a plan view of the electromagnetic steel plate K at opposite ends of the rotor iron core employed in the synchronous motor of FIG. 35.

A fourteenth preferred embodiment of the present invention will be described with reference to FIGS. 35 to 37, wherein FIG. 35 illustrates a longitudinal sectional view of the rotor used in the synchronous motor according to the fourteenth embodiment of the present invention, FIG. 36 illustrates a plan view of an electromagnetic steel plate J positioned inwardly of opposite axial ends of the rotor, iron core and FIG. 37 illustrates a plan view of an electromagnetic steel plate K positioned at the opposite axial ends of the rotor iron core.

Referring now to FIGS. 35 to 37, reference numeral 91 represents a rotor, and reference numeral 92 represents a rotor iron core of a laminated structure including the electromagnetic steel plates J 110 and the electromagnetic steel plates K 111. The electromagnetic steel plates J 110 and K 111 are formed with respective conductor bar slots 112 of the same size, respective barrier slots 113 of the same size for preventing the magnetic flux shortcircuit, respective holes 99 of the same size and respective bearing holes 114 of the same size, which are aligned with each other. Reference numerals 96b and 96a represent magnet retaining holes defined at the same position, wherein respective hole widths R and S as measured in a direction radially thereof are so chosen as to satisfy the relationship R<S.

Reference numeral 93 represents conductor bars made of aluminum and filled in the respective slots 112. The conductor bars 93 are integrally molded together with the shortcircuit rings 94 at the axially opposite ends of the rotor iron core 92 by means of any known aluminum die casting technique to thereby form the starter squirrel cage conductor. Reference numeral 95 represents permanent magnets, every two of which are, after the aluminum die casting, held in end-to-end abutment to represent a generally V-shaped configuration and are then inserted and arranged in the magnet retaining holes 96 and 96a so that the two pairs of the permanent magnets 95 can define two magnetic poles. The barrier slots 113 are filled up with aluminum injected during the aluminum die casting to avoid any possible shortcircuit between the neighboring permanent magnets of the different polarities. Reference numeral 98 represents a non-magnetizable end plate for protection of the permanent magnets 95, which end plate has an engagement hole 98a defined therein. Reference numeral 99 represents an axial hole defined in the rotor iron core 92 so as to extend axially thereof, in which hole is filled aluminum 100 that is injected during the aluminum die casting to form the starter squirrel cage conductor. The aluminum 100 filled in the axial hole 99 has projections 100a protruding outwardly from the axially opposite ends of the rotor iron core 92. The end plates 98 are, after the engagement holes 98a have received therein the projections 100a, fixed to the respective axial end faces of the rotor iron core 92 by staking or crimping the projections 100a to enlarge as shown by broken lines. Reference numerals 101 and 114 represents respective bearing holes.

It is to be noted that although in the foregoing description the permanent magnets which have been magnetized are inserted and arranged, the rotor magnetic poles may be equally formed by inserting and arranging permanent magnets, which have not yet been magnetized, in the rotor iron core to complete the rotor and then polarizing the permanent magnets with the use of a magnetizing apparatus.

During the manufacture of the self-starting synchronous motor of the structure described above, and at the time the shortcircuit rings 94 formed by the aluminum die casting cool, the outer diameter of the magnet retaining holes 96a in the electromagnetic steel plates K 111 at each axial end of the rotor iron core 92 deforms and contracts under the influence of a force of shrinkage acting in an inner radial direction. However, since the hole width S of the magnet retaining holes 96a is sufficiently larger than the hole width R of the magnet retaining hole 96 in the electromagnetic steel plates J that are small of the shrinkage force of the shortcircuit rings 94, there is no possibility that as a result of reduction in gap between the permanent magnets 95b and the magnet retaining holes 96a that is brought about by deformation and shrinkage insertion of the permanent magnets 95 into the respective magnet retaining holes 96a is difficult to achieve.

The hole width S of the magnet retaining holes 98a is so chosen as to be slightly greater than R by a quantity that a side adjacent an outer diameter of the hole width S when receiving the shrinkage force of the shortcircuit ring 94 can line up with a side adjacent an outer diameter of the hole width R of the magnet retaining hole 96, and accordingly, a possibility can be avoided which would, as a result of reduction of the coefficient of permeance of the magnetic circuit can be lowered, the motor characteristic may correspondingly decrease.

As hereinabove described, the self-starting synchronous motor of the type employing the permanent magnets according to the fourteenth embodiment is advantageous in that the permanent magnets 5 can be easily inserted subsequent to the aluminum die casting and that a high-performance motor characteristic can be maintained.

FIFTEENTH EMBODIMENT (FIGS. 38 AND 39)

Figure 38:
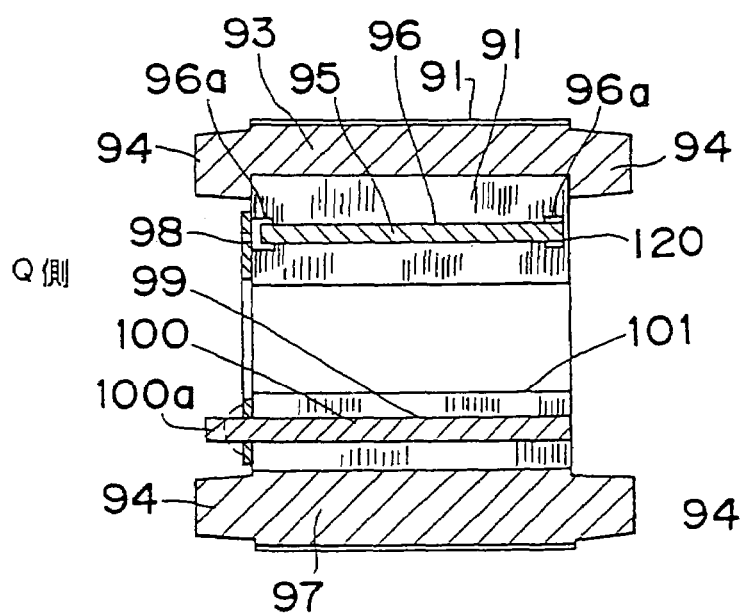
FIG. 38 is a longitudinal sectional view of the rotor used in the self-starting synchronous motor of the type employing the permanent magnets according to a fifteenth preferred embodiment of the present invention.

A fifteenth preferred embodiment of the present invention will be described with reference to FIGS. 38 and 39 in combination with FIGS. 36 and 37. FIG. 38 is a longitudinal sectional view of the rotor used in the self-starting synchronous motor of the type employing the permanent magnets according to the fifteenth preferred embodiment of the present invention, and FIG. 39 is a plan view of the electromagnetic steel plate L at one end face of the rotor iron core 92 of FIG. 38.

Figure 39:
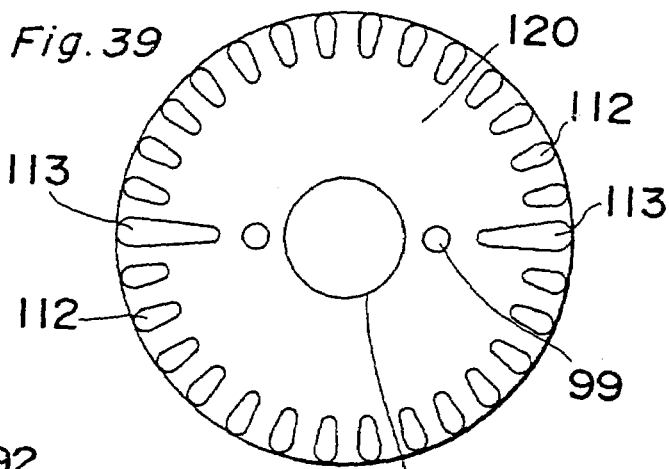
FIG. 39 is a plan view of the electromagnetic steel plate L at one end face of the rotor iron core used in the synchronous motor of FIG. 38.

Referring now to FIGS. 38 and 39, one or a plurality of electromagnetic steel plates L 120 at one end of the rotor iron core on the P side have no magnet retaining hole defined therein. The electromagnetic steel plates on the axially opposite ends of the rotor iron core 92 are laminated with the same electromagnetic steel plates K 111 as those shown in FIG. 37 in connection with the fourteenth embodiment and the electromagnetic steel plates J 110 are laminated inwardly of the opposite ends. Since the axial end face of the permanent magnets abuts against the electromagnetic steel plate L, the number of the electromagnetic steel plates L laminated is so chosen that respective axial centers of the rotor iron core and the permanent magnets can match with each other.

In the fifteenth embodiment of the present invention which is so constructed as hereinabove described, since the rotor 91 is such that one or a plurality of the electromagnetic steel plates L 120 at the end of the rotor iron core 92 on the P side has no magnet retaining hole defined therein, the only end plate 98 is sufficient on the opposite Q side and, therefore, the cost for material and the number of fitting steps can be reduced advantageously. Also, since the hole width S of the magnet retaining holes 96a in the electromagnetic steel plates K 111 on the axially opposite ends of the rotor iron core 2 is sufficiently greater than the hole width R of the magnet retaining holes 96 in the inside electromagnetic steel plates J 110, even though a radially inwardly shrinking deformation occurs under the influence of the radially inwardly acting shrinkage force from the shortcircuit rings 94 subsequent to the aluminum die casting, the permanent magnets 95 can be carried out without being disturbed and, since as is the case with the first embodiment of the present invention, the gaps between the permanent magnets 95b and the magnet retaining holes in the rotor iron core 92 are properly maintained, a high-performance motor characteristic can be maintained.

SIXTEENTH EMBODIMENT (FIG. 40)

Figure 40:
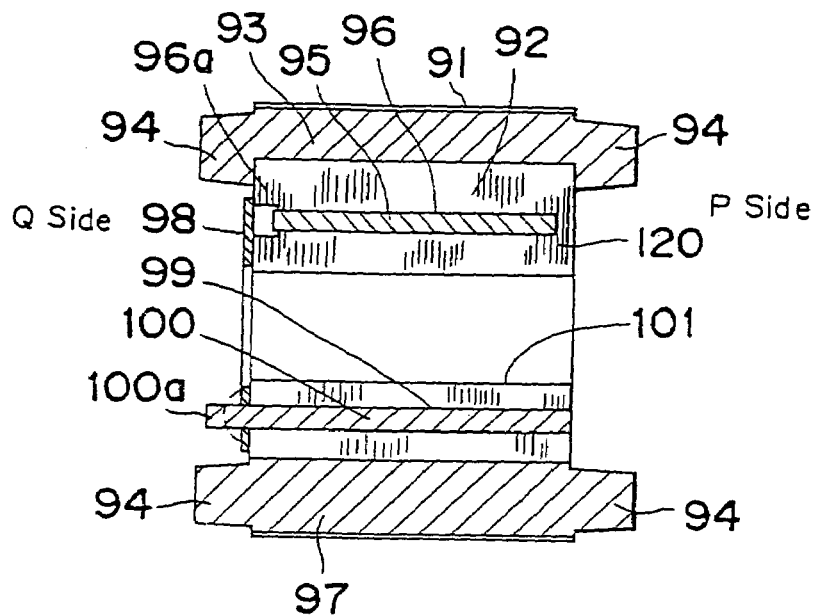
FIG. 40 is a longitudinal sectional view of the rotor employed in the self-starting permanent magnet synchronous motor according to a sixteenth preferred embodiment of the present invention.

A sixteenth preferred embodiment of the present invention will be described with reference to FIG. 40 in combination with FIGS. 36 to 38. FIG. 40 is a longitudinal sectional view of the rotor employed in the self-starting permanent magnet synchronous motor according to the sixteenth embodiment. As shown in FIG. 40, one or a plurality of electromagnetic steel plates L 120 shown in FIG. 40 and having no magnet retaining holes defined therein are laminated to one end of the rotor iron core 92 on the P side, and one or a plurality of electromagnetic steel plates K 111 having the magnet retaining holes of a relatively great hole width are laminated to the opposite end of the rotor iron core 92 on the Q side. Since no magnet retaining hole is defined in the electromagnetic steel plates L 120 on the P side end, the shrinkage stress of the shortcircuit ring 94 has no concern therewith and, therefore, the permanent magnets 95 can easily be inserted in the rotor iron core 92 if the electromagnetic steel plates K 111 having the magnet retaining holes 96 of a relatively great hole width are arranged only on the Q side. Accordingly, the rotor iron core 92 can be assembled with a minimized combination of the electromagnetic steel plates J 110, K 111 and L 120, thereby facilitating the manufacture thereof and also maintaining a high-performance motor characteristic.

SEVENTEENTH EMBODIMENT (FIGS. 41 AND 42)

Figure 41:
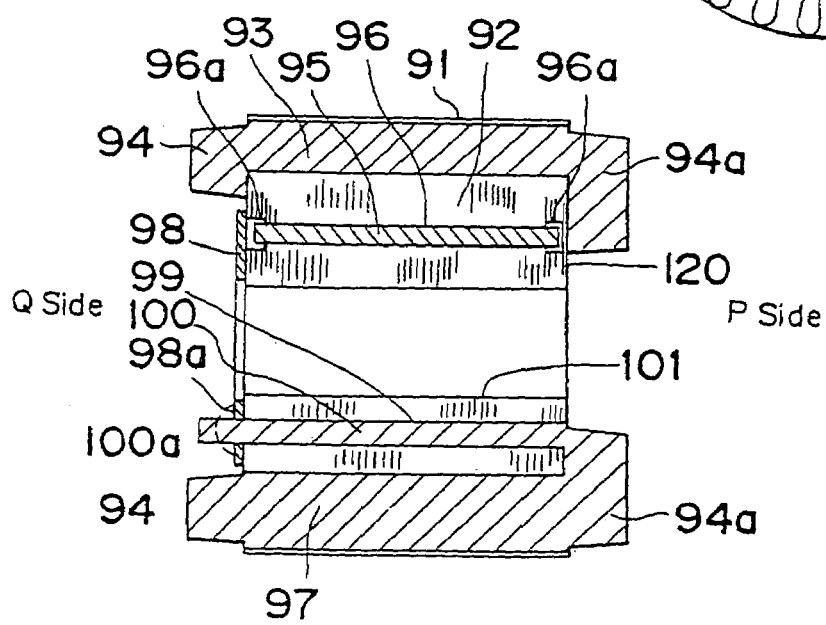
FIG. 41 is a longitudinal sectional view of the rotor employed in the self-starting permanent magnet synchronous motor according to a seventeenth preferred embodiment of the present invention.

A seventeenth preferred embodiment of the present invention will be described with reference to FIGS. 41 and 42 in combination with FIG. 39. FIG. 41 is a longitudinal sectional view of the rotor employed in the self-starting permanent magnet synchronous motor according to the seventeenth embodiment and FIG. 42 is an end view of the synchronous motor viewed from the P side in FIG. 41.

The basic structure of the rotor in the seventeenth embodiment is substantially similar to that described in connection with any of the fifteenth and sixteenth embodiments.

Figure 42:
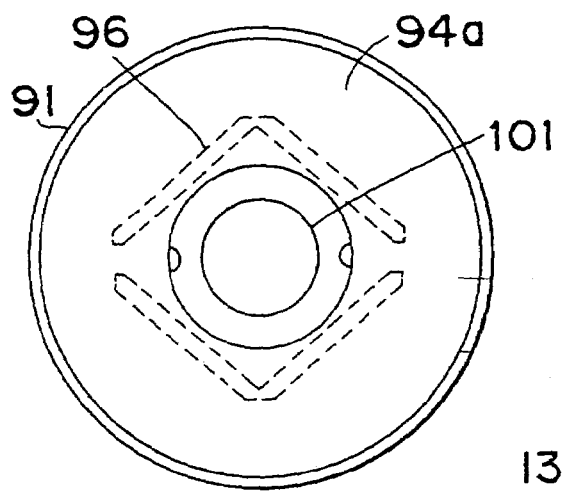
FIG. 42 is an end view of the synchronous motor shown in FIG. 41.

Referring to FIGS. 41 and 42, the shortcircuit ring 94a having a reduced inner diameter is formed on an outer end face of the electromagnetic steel plates L 120 shown in FIG. 39 and having no magnet retaining hole defined therein on the P side, by means of the aluminum die casting. The inner diameter of the shortcircuit ring 94a is such that it can be enclosed inwardly of the whole of the magnet retaining holes 96 and 96a defined respectively in the electromagnetic steel plates j and K as shown by the broken lines, or partly inwardly thereof although not shown. Since the electromagnetic steel plates L 120 have no magnet retaining hole such as identified by 96, there is no possibility that during the aluminum die casting aluminum may penetrate into the magnet retaining holes 96. In view of the foregoing, the shortcircuit ring 94a can have an increased cross-sectional surface area to thereby reduce a secondary resistance of the rotor, the rotational speed of the motor at the time of a maximum torque en route the synchronous speed and the at the time of the maximum torque can increase to facilitate a synchronous entanglement, thereby increasing the starting performance of the motor.

EIGHTEENTH EMBODIMENT (FIG. 43)

Figure 43:
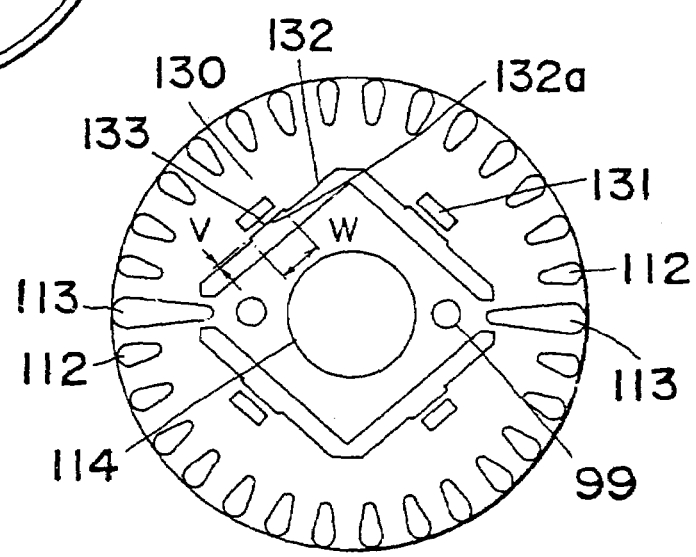
FIG. 43 is a plan view of the electromagnetic steel plate of the rotor used in the self-starting permanent magnet synchronous motor according to an eighteenth preferred embodiment of the present invention.
Figure 44:
FIG. 44 is a fragmentary enlarged sectional view of an entwining portion as viewed in a direction conforming to the direction of lamination in the synchronous motor of FIG. 43.

An eighteenth preferred embodiment of the present invention will be described with reference to FIG. 43 which shows a plan view of an electromagnetic steel plate M for the rotor of the self-starting permanent magnet synchronous motor according to the eighteenth embodiment.

The basic structure of the rotor the eighteenth embodiment is substantially similar to that described in connection with any of the eighteenth and seventeenth embodiments. Referring now to FIG. 43, reference numeral 131 represents entwining portions for lamination of the electromagnetic steel plates. As shown in FIG. 43, when the electromagnetic steel plates are blanked one by one, press projections are formed and are laminated together while sequentially entwined therewith to thereby form the rotor iron core. In such case, the entwining portions 131 are defined at respective locations outwardly of the magnet retaining holes 132. Reference numeral 132a represents an enlarged portion in which the hole width of a portion of each magnet retaining hole 132 adjacent the corresponding entwining portion 131 is enlarged radially outwardly by a required quantity V towards such corresponding entwining portion 131. Reference numeral 133 represents a pincer portion of the electromagnetic steel plate M 130 bound between the corresponding entwining portion 131 and the enlarged portion 132a of each magnet retaining hole.

According to the eighteenth embodiment, since the provision has been made of the enlarged portion 132a in which the hole width of each magnet retaining hole adjacent the corresponding entwining portion 131 is increased by the quantity V towards the entwining portion 131, even though the corresponding pincer portion 133 is deformed to protrude inwardly of the associated magnet retaining hole 132 under the influence of press stresses during formation of the corresponding entwining portion by the use of a press work, the deformation can be accommodated within the enlarged quantity V and, therefore, the permanent magnet can easily be inserted without being disturbed. Also, since the enlarged portion 132a has a length W that is small in correspondence with the length of the adjacent entwining portion 131 and, also, the specific value of the quantity V is small and will decrease in response to inward deformation of the pincer portion 133, the gap with the permanent magnet is very minute and the coefficient of permeance of the magnetic circuit will not decrease substantially, thereby securing a high-performance motor characteristic.

It is to be noted that in the foregoing description the entwining portion 131 has been described as positioned outside the associated magnet retaining hole 132, but it may be positioned inside the associated magnet retaining hole and even in this case similar effects can be obtained.

It is also to be noted that since if each of the permanent magnets is made of a rare earth metal of, for example, Nd—Fe—B system, a high magnetic force can be obtained and, therefore, the rotor and the motor as a whole can advantageously be manufactured in a compact size and lightweight.

It is further to be noted that although in the foregoing embodiment reference is made to the rotor of the synchronous motor employing the two poles, the present invention may not be limited thereto and may be equally applied to the rotor having, for example, four or more magnetic poles.

Again, although in any one of the foregoing embodiments the single pole has been formed by abutting two plate-like permanent magnets of the same polarity in end-to-end fashion, the present invention may not be limited thereto and the single pole may be formed by the use of a single permanent magnet or three or more plate-like permanent magnets of the same polarity. Similarly, although the permanent magnets have been employed in the plate-like form, the present invention is not limited thereto and the present invention is equally applicable to the rotor employing permanent magnets of, for example, an arcuate shape or any other suitable shape.

NINETEENTH EMBODIMENT (FIGS. 45 TO 47)

Figure 45:
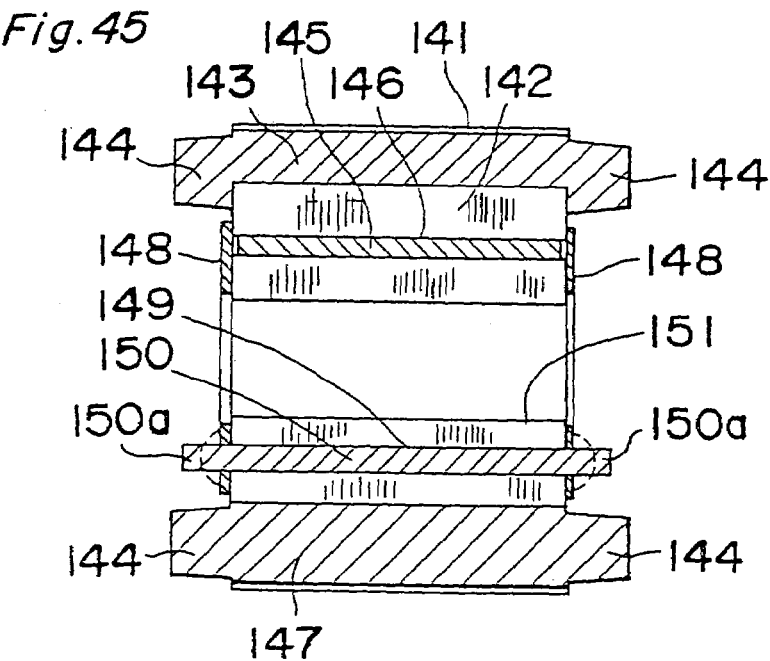
FIG. 45 is a longitudinal sectional view of the self-starting permanent magnet synchronous motor according to a nineteenth preferred embodiment of the present invention.
Figure 46:
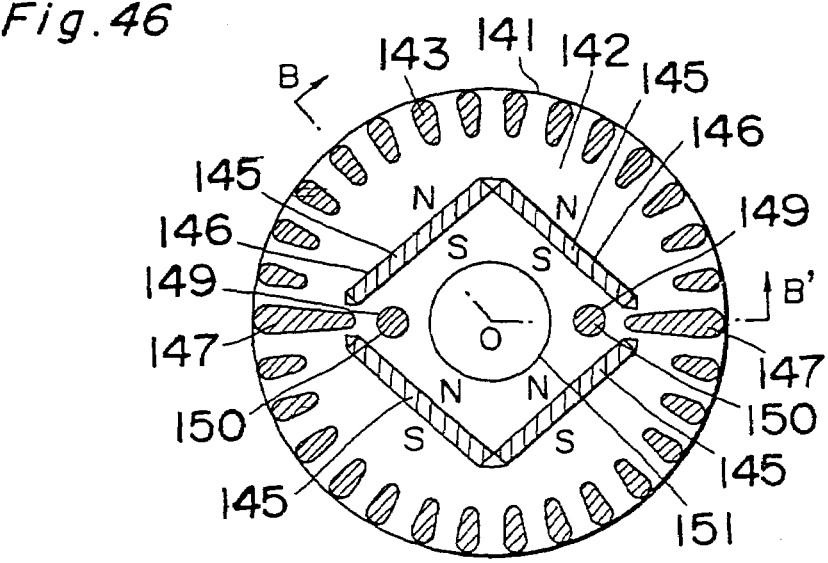
FIG. 46 is a transverse sectional view of the rotor used in the synchronous motor shown in FIG. 45.
Figure 47:
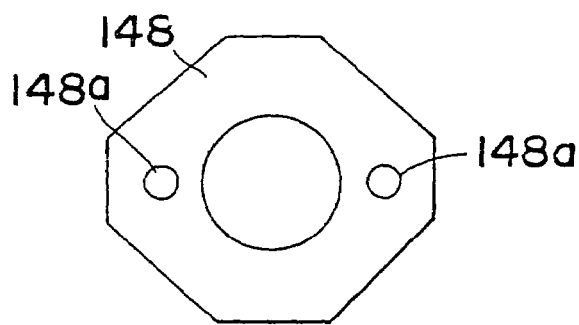
FIG. 47 is a plan view of the end plate used in the synchronous motor shown in FIG. 45.

A nineteenth preferred embodiment of the present invention will now be described with reference to FIGS. 45 to 47, wherein FIG. 45 illustrates a longitudinal sectional view of the rotor used in the self-starting synchronous motor of the type employing the permanent magnets according to the nineteenth embodiment, FIG. 46 is a transverse sectional view of the rotor and FIG. 47 is a plan view of an end plate. In these figures, reference numeral 141 represents a rotor, and reference numeral 142 represents a rotor iron core made of a laminate of electromagnetic steel plates. Reference numeral 143 represents conductor bars which are molded integrally together with shortcircuit rings 144, positioned at axially opposite ends of the rotor iron core 142, by the use of the aluminum die casting technique to form a starter squirrel cage conductor. Reference numeral 145 represents permanent magnets, every two of which are held in end-to-end abutment to represent a generally V-shaped configuration and are so arranged that the two pairs of the permanent magnets 145 can define two magnetic poles. Reference numeral 147 represents shortcircuit preventive barriers for preventing shortcircuit of the magnetic fluxes between the permanent magnets of the different polarities and filled up with aluminum die cast. Reference numeral 148 represents an end plate made of a non-magnetizable material and used of protection of the permanent magnets 145, in which engagement holes 148a are defined. Reference numeral 149 represents an axial hole defined in the rotor iron core 142 so as to extend axially thereof, in which hole is filled aluminum 150 that is injected during the aluminum die casting to form the starter squirrel cage conductor. The aluminum 150 filled in the axial hole 149 has projections 150a protruding outwardly from the axially opposite ends of the rotor iron core 142. The end plates 148 are, after the engagement holes 148a have received therein the projections 150a, fixed to the respective axial end faces of the rotor iron core 142 by staking or crimping the projections 150a to enlarge as shown by broken lines.

As hereinabove described, in the self-starting synchronous motor according to the nineteenth embodiment, since the projections 150a used to secure the end plates 148 to the axially opposite ends of the rotor 141 are formed simultaneously with formation of the starter squirrel cage conductor by the use of the aluminum die casting technique and since the end plates 148 can be firmly secured to the axially opposite end faces of the rotor iron core 142 merely by staking or crimping the projections 150a, the cost for the material and the number of assembling steps can be considerably reduced as compared with the prior art in which bolts are employed, thereby making it possible to provide an inexpensive self-stating synchronous motor of the kind employing the permanent magnets.

TWENTIETH EMBODIMENT (FIG. 48 TO 50)

Figure 48:
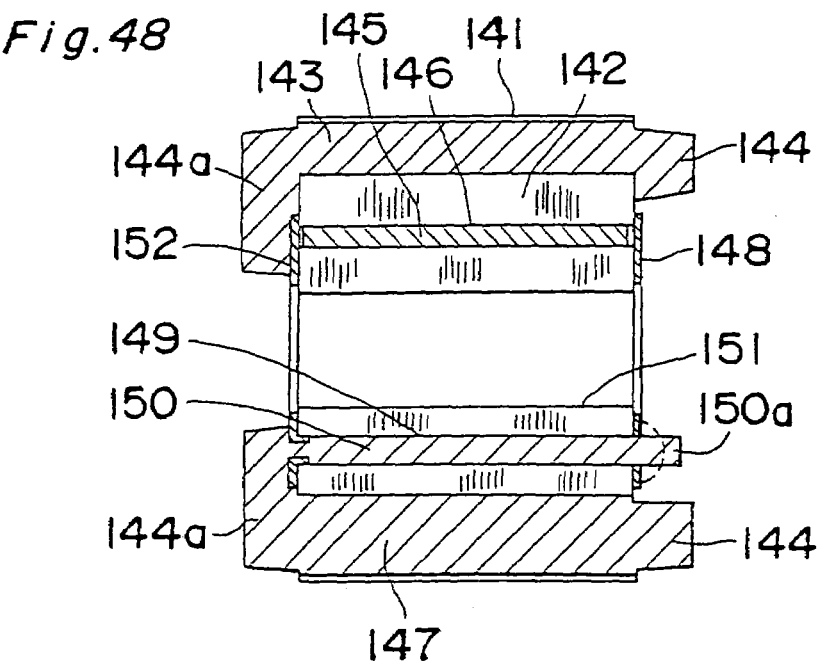
FIG. 48 is a longitudinal sectional view of the self-starting permanent magnet synchronous motor according to a twentieth preferred embodiment of the present invention.
Figure 49:
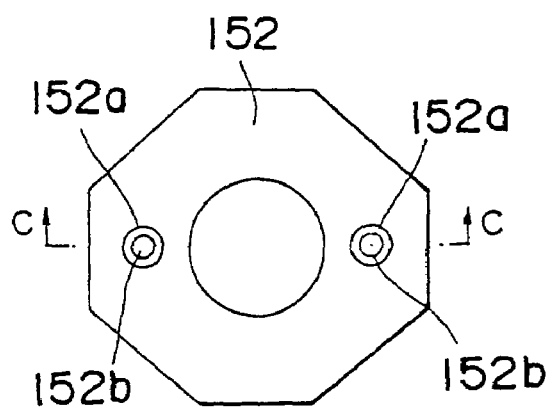
FIG. 49 is a plan view of the end plate used in the synchronous motor shown in FIG. 48.
Figure 50:
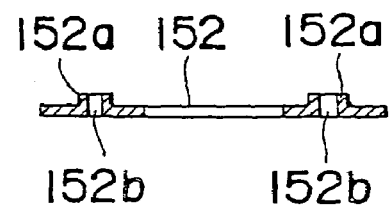
FIG. 50 is a cross-sectional view taken along the line C–C' in FIG. 49.

A twentieth preferred embodiment of the present invention will now be described with reference to FIGS. 48 to 50, wherein FIG. 48 is a longitudinal sectional view of the self-starting permanent magnet synchronous motor, FIG. 49 is a plan view of the end plate used in the synchronous motor shown in FIG. 48, and FIG. 50 is a cross-sectional view taken along the line C–C' in FIG. 49. As shown in FIG. 48, the shortcircuit rings 144a are formed so as to cover the end plates 152. Accordingly, the end plate 152 is integrated with the axially end face of the rotor iron core 152 by means of the aluminum die casting used to form the starter squirrel cage conductor.

Referring to FIGS. 49 and 50, the end plate 152 is formed with two projections 152a each having a respective hole 152 defined therein so as to extend completely across the thickness thereof. Prior to the aluminum die casting, the end plate 152 is secured to the corresponding end face of the rotor iron core 142 with the projections 152a protruding through the holes 149 to thereby position the respective end plate 152 so that the end plate 152 will not displace during the aluminum die casting in which a high pressure may act on the end plate 152 to allow the end plate 152 to be firmly connected to the associated end face of the rotor iron core 142 without being displaced in position. On the other hand, the end plate 148, the end plate 148 is, as is the case with that in the previously described nineteenth embodiment, fixed to the end face of the rotor iron core 142 by staking or crimping the projections 150a after the end plate 148 has been engaged with the projections 150a for fixing the end plate.

As hereinabove described, since the end plate 152 is integrally connected with the rotor iron core 142 by means of the aluminum die casting, a job of securing the end plate by staking or crimping the projections 150a has to be performed only in association with the end plate 148 and, therefore, as compared with the previously described nineteenth embodiment, the number of assembling steps can further be reduced.

TWENTY-FIRST EMBODIMENT
(FIGS. 51 AND 52)

Figure 51:
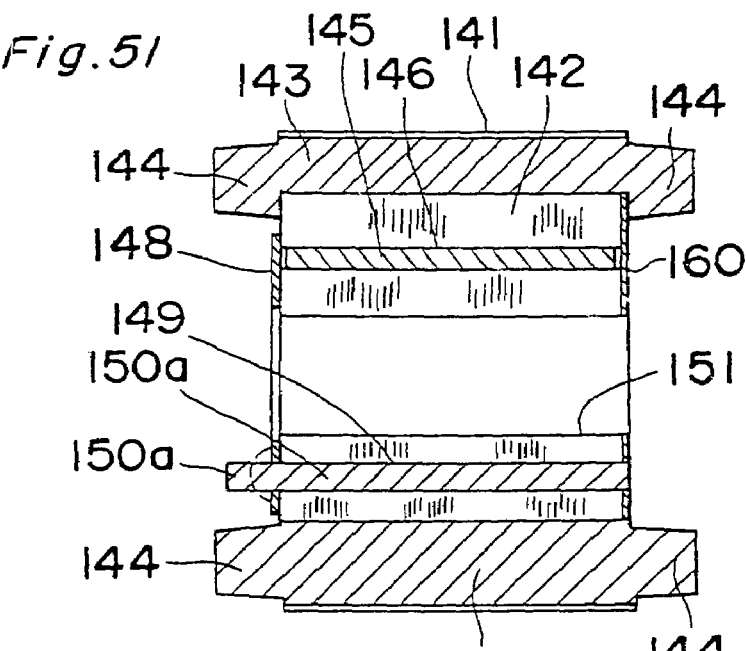
FIG. 51 is a longitudinal sectional view of the self-starting permanent magnet synchronous motor according to a twenty first preferred embodiment of the present invention.
Figure 52:
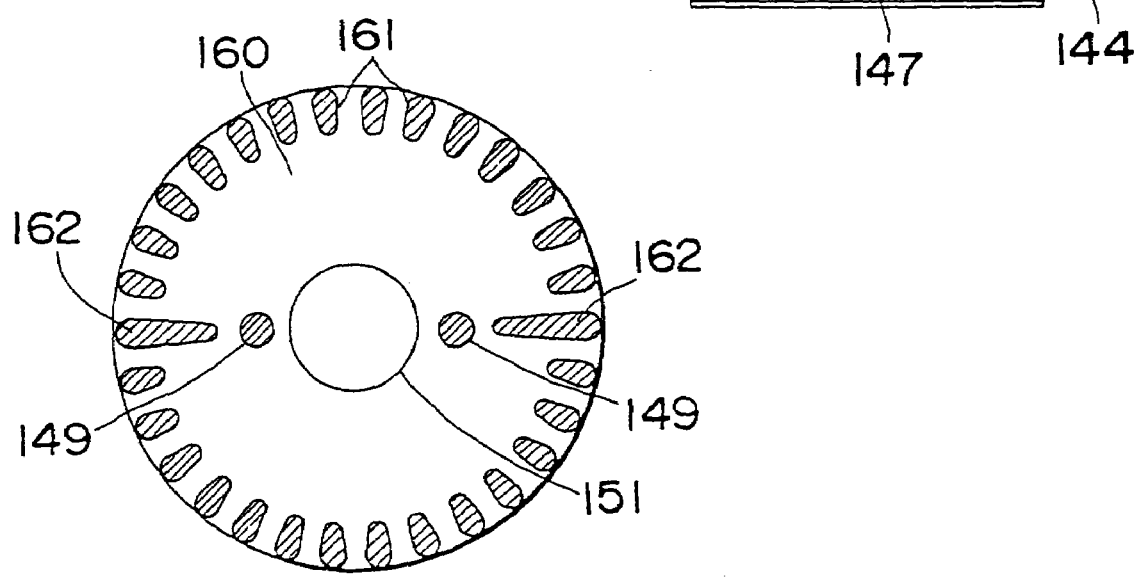
FIG. 52 is a plan view of the electromagnetic steel plate at the end of the rotor iron core employed in the synchronous motor shown in FIG. 51.

A twenty-first preferred embodiment of the present invention will be described with reference to FIGS. 51 and 52, wherein FIG. 51 illustrates a longitudinal sectional view of the rotor used in the self-starting synchronous motor and FIG. 52 is a plan view of an electromagnetic steel plate positioned at an axial end of the rotor iron core used in the rotor of FIG. 51. Referring to FIGS. 51 and 52, the electromagnetic steel plate 160 positioned at the axial end of the rotor iron core 142 having conductor bar slots 161, barrier holes 162 for preventing the magnetic flux shortcircuit, holes 149 and a bearing hole 150 all defined therein is of the same shape as that used at a different position, but no magnet retaining hole 146 defined therein. Although this electromagnetic steel plate 160 is manufactured by blanking with the use of the same core dies as used for the other electromagnetic steel plates, since mold pieces used to form the magnet retaining holes 146 in the electromagnetic steel plate 160 by the use of a blanking technique are of a type that can be removably mounted on a die assembly, it is easy to avoid formation of the magnet retaining holes 146 in the electromagnetic steel plate 160 at the time the latter is blanked off from a metal sheet. Accordingly, the rotor iron core 142 can be integrally formed together with the electromagnetic steel plate 160 and, if this is aluminum die cast, the starter squirrel cage conductor can be formed.

Because of the structure described-above, the end plate on the other end is needed and, as is the case with the previously described twentieth embodiment, a job of securing the end plate by staking or crimping the projections 150a has to be performed only in association with the end plate 148 and, therefore, as compared with the previously described nineteenth embodiment, the number of assembling steps can further be reduced.

TWENTY-SECOND EMBODIMENT
(FIGS. 53 AND 54)

Figure 53:
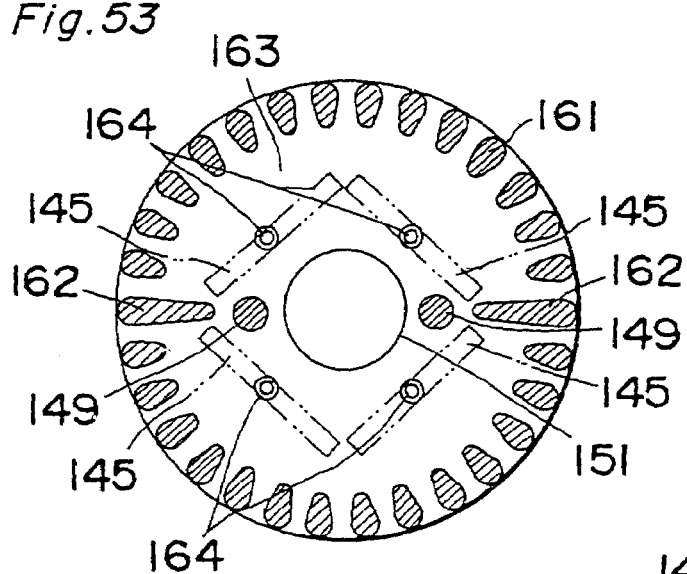
FIG. 53 is a plan view of the electromagnetic steel plate at the end of the rotor iron core employed in the self-starting synchronous motor according to a twenty-second preferred embodiment of the present invention.
Figure 54:
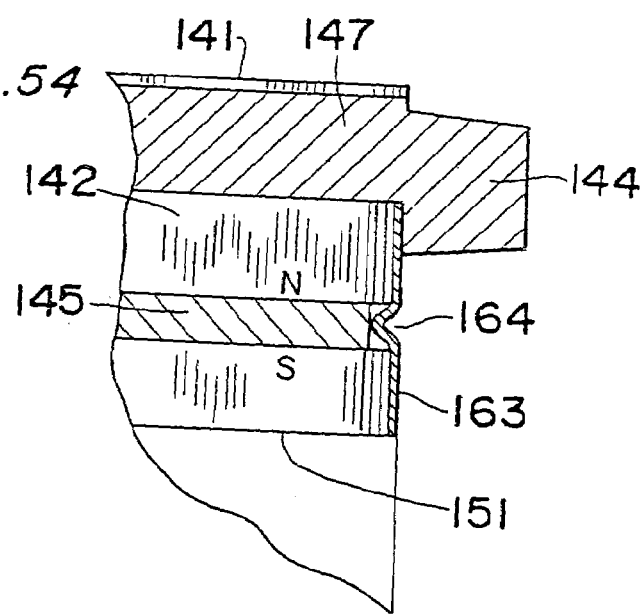
FIG. 54 is a fragmentary enlarged longitudinal sectional view of the rotor employed in the synchronous motor shown in FIG. 53.

A twenty-second preferred embodiment of the present invention will now be described with reference to FIGS. 53 and 54, wherein FIG. 53 is a plan view of the electromagnetic steel plate at the axial end of the rotor iron core and FIG. 54 is a fragmentary enlarged view showing a portion of the rotor 141.

Referring to FIGS. 153 and 154, reference numeral 162 represents an electromagnetic steel plate disposed at an axial end of the rotor iron core 141, and reference numeral 164 represents a projection protruding inwardly of the permanent magnets 154 at a location where the electromagnetic steel plate 163 engages the permanent magnets 145. Accordingly, the permanent magnets 145 are axially positioned with the projection 164 in the electromagnetic steel plate 163 brought into engagement therewith.

According to the embodiment shown in FIGS. 53 and 54, shortcircuit of the magnetic fluxes between the front and rear, different poles of the permanent magnets 145 through the electromagnetic steel plate 163 can be reduced considerably, thereby to increase the performance of the motor. It is to be noted that although this electromagnetic steel plate 163 is manufactured by blanking with the use of the same core dies as used for the other electromagnetic steel plates, since mold pieces used to form the projection 163 are of a type that can be removably mounted on a die assembly, the rotor iron core 142 can easily be formed integrally together with the electromagnetic steel plate 163.

TWENTY-THIRD EMBODIMENT
(FIGS. 55 TO 57)

Figure 55:
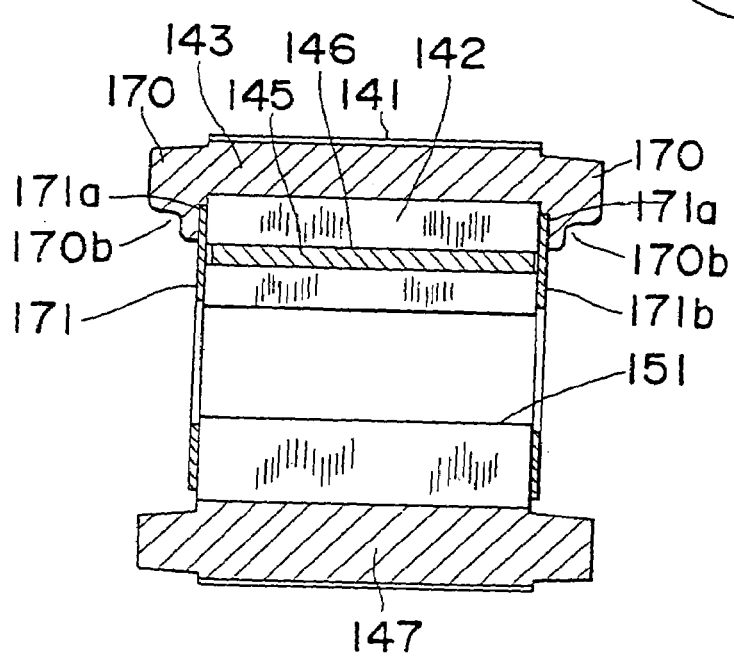
FIG. 55 is a longitudinal sectional view of the self-starting permanent magnet synchronous motor according to a twenty-third preferred embodiment of the present invention.
Figure 56:
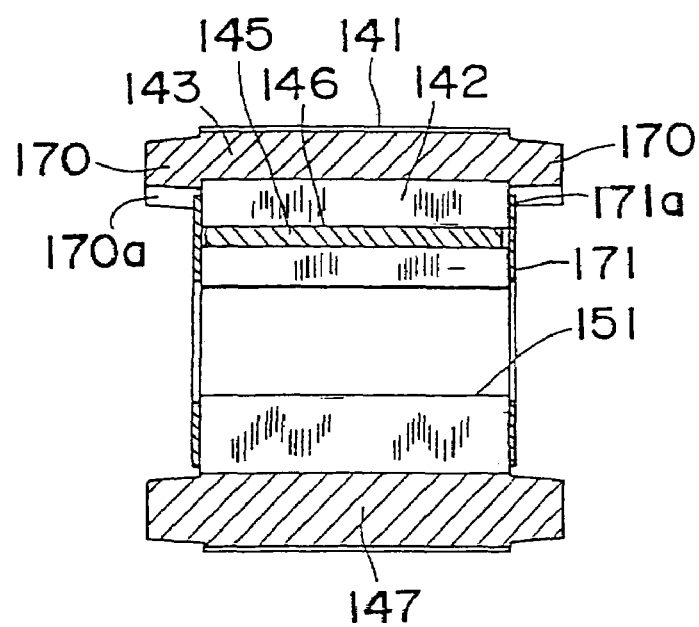
FIG. 56 is a longitudinal sectional view of the synchronous motor before the end plate is fixed.
Figure 57:
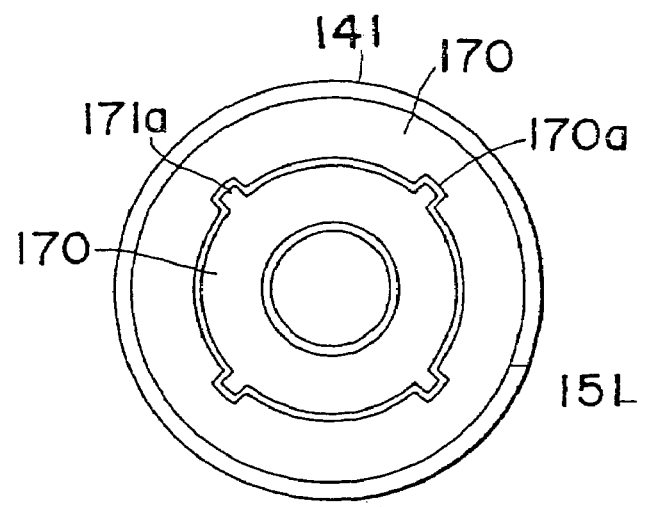
FIG. 57 is an end view of the synchronous motor of FIG. 56.

A twenty-third embodiment of the present invention will be described with reference to FIGS. 55 to 57, wherein FIG. 55 is a longitudinal sectional view of the complete rotor used in the self-starting synchronous motor according to this embodiment, FIG. 56 is a longitudinal sectional view of the rotor before the end plates are fixed, and FIG. 57 is an end view of the rotor shown in FIG. 56. Referring to FIGS. 56 and 57, the end plate 171 has its outer periphery formed with radial projections 171a and, on the other hand, the shortcircuit ring 170 formed by the aluminum die casting has an inner periphery formed with a radial recesses 170a complemental in shape to the radial projections 171a in the end plate 171. After the radial projections 171a in the end plate 171 have been engaged in the corresponding radial recesses 170a in the shortcircuit ring 170, peripheral portions of the radial recesses 170a in the shortcircuit ring 170 are axially pressed to deform as shown by 170b in FIG. 55 to thereby fix the end plate 171 to the rotor iron core 2.

According to the twenty-third embodiment, fixing of the end plate 171 can easily be accomplished merely by pressing the radial recesses 170a in the shortcircuit ring 170 to deform in the manner described above and, therefore, the number of assembling steps can advantageously be reduced.

It is to be noted that where the permanent magnets is made of a rare earth metal of, for example, Nd—Fe—B system, a strong magnetic force can be obtained and, therefore, the rotor as well as the motor as a whole can be manufactured in a compact size and lightweight.

It is also to be noted that in any one of the foregoing embodiments the rotor has been shown having two magnetic poles, it may have four or more magnetic poles. In addition, although in any one of the foregoing embodiments the single pole has been formed by abutting two plate-like permanent magnets of the same polarity in end-to-end fashion, the present invention may not be limited thereto and the single pole may be formed by the use of a single permanent magnet or three or more plate-like permanent magnets of the same polarity. Similarly, although the permanent magnets have been employed in the plate-like form, the present invention is not limited thereto and the present invention is equally applicable to the rotor employing permanent magnets of, for example, an arcuate shape or any other suitable shape.

TWENTY-FOURTH EMBODIMENT
(FIGS. 60 TO 62)

Figure 60:
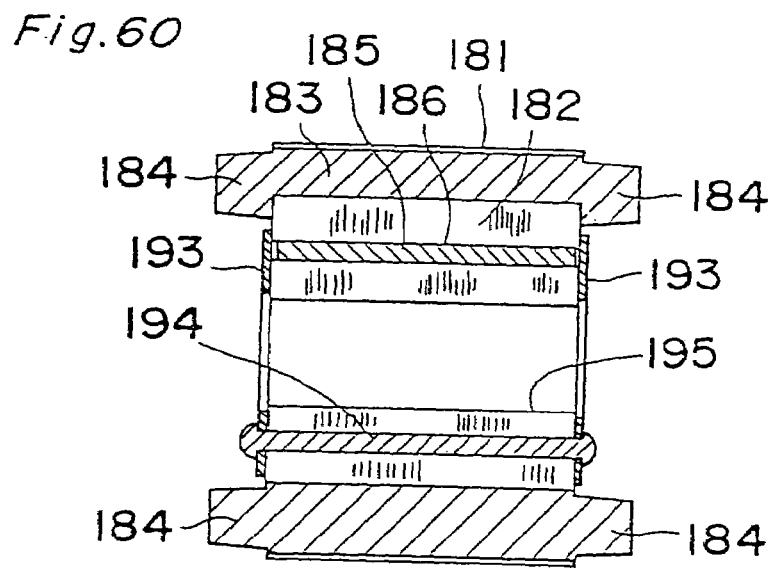
FIG. 60 is a longitudinal sectional view of the rotor used in the self-starting permanent magnet synchronous motor according to a twenty-fourth preferred embodiment of the present invention.
Figure 61:
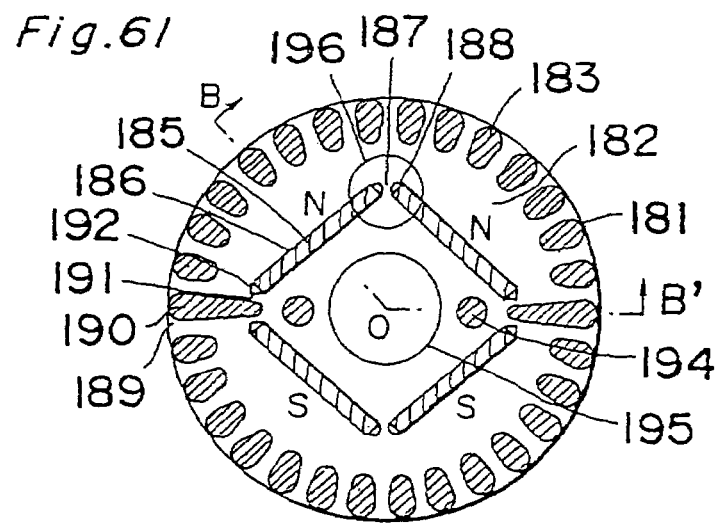
FIG. 61 is a transverse sectional view of the rotor shown in FIG. 60.
Figure 62:
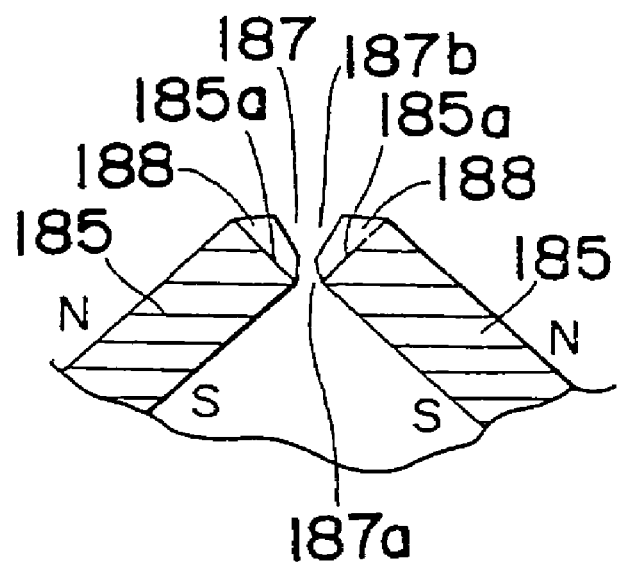
FIG. 62 is a fragmentary enlarged view showing a bridge portion.

A twenty-fourth preferred embodiment of the present invention will now be described with reference to FIGS. 60 to 62, wherein FIG. 60 illustrates a longitudinal sectional view of the rotor used in the self-starting synchronous motor according to this embodiment, FIG. 61 is a transverse sectional view of the rotor shown in FIG. 60 and FIG. 62 is a fragmentary enlarged view showing an encircled portion indicated by 196 in FIG. 61.

Referring now to FIGS. 60 to 62, reference numeral 181 represents a rotor, and reference numeral 182 represents a rotor iron core made of a laminate of electromagnetic steel plates. Reference numeral 183 represents conductor bars that are formed integrally together with shortcircuit rings 184, positioned at axially opposite ends of the rotor iron core 182, by the use of an aluminum die casting technique to form a starter squirrel cage conductor. Reference numeral 185 represents permanent magnets accommodated within magnet retaining holes 186, with each pair of plate-like permanent magnets 185 of the same polarity butted end-to-end in a generally V-shaped configuration to form a single rotor magnetic pole. Since four permanent magnets 185 are employed in the rotor, two rotor magnetic poles are formed and, thus, the rotor as a whole has two magnetic poles.

A bridge portion indicated by 187 is so shaped as to have its width including a narrow portion 187a and a large-width portion 187b increasing in width in a direction radially outwardly from the narrow portion 187a. Shortcircuit of the magnetic fluxes between front and rear, opposite poles of the permanent magnets 185 can advantageously be prevented since magnetic saturation takes place at the narrow portion 187a.

Also, since an air space 188 is defined between each of respective end faces 185a of the neighboring permanent magnets 185 and the bridge portion 187, shortcircuit of the magnetic fluxes between the opposite poles within the end faces 185a of the neighboring permanent magnets 185 can advantageously be avoided.

Reference numeral 189 represents barrier slots for prevention of the magnetic flux shortcircuit that are defined between the neighboring permanent magnets 185 of the different polarities, which slots are filled up with aluminum injected during the aluminum die casting. A bridge portion 191 of the rotor iron core 182 between each barrier slot 189 and each magnet retaining hole 186 is so shaped as to have a small width, and at this bridge portion 191, magnetic saturation takes place to prevent the magnetic fluxes emanating from the opposite poles of the permanent magnets 185 from shortcircuiting. Also, an air space 192 is formed between an end face of each permanent magnet 185 and the adjacent bridge portion 191 to prevent the magnetic fluxes from the opposite poles within the end faces of the permanent magnets 185 from shortcircuiting. Reference numeral 193 represents an end plate made of a non-magnetizable material for protecting the permanent magnets 185. This end plate 193 is riveted to axially opposite end faces of the rotor iron core 182 by means of rivet pins 194. Reference numeral 195 represents a bearing hole defined in the rotor.

According to the twenty-fourth embodiment, the rotor 181 can be assembled by embedding the permanent magnets 185 in the respective magnet retaining holes 186 after the starter squirrel cage conductor has been formed by the aluminum die casting in the rotor iron core 182 made of a laminate of the electromagnetic steel plates, and subsequently riveting the end-plate 193 to each of the axially opposite end faces of the rotor iron core 182 by means of the rivet pins 194.

Figure 58:
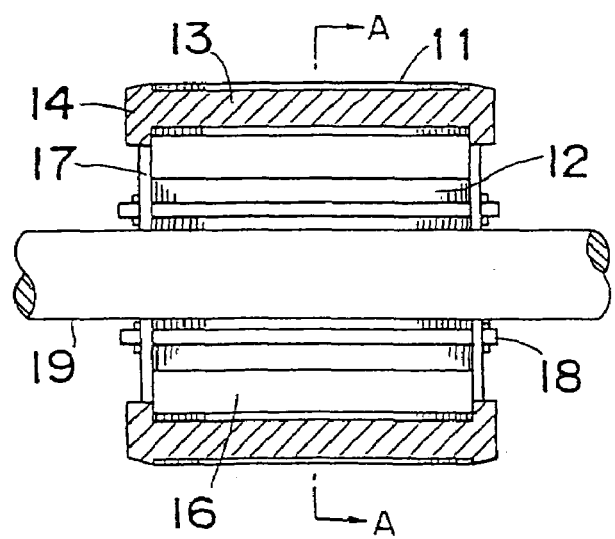
FIG. 58 is a longitudinal sectional view of the prior art rotor.
Figure 59:
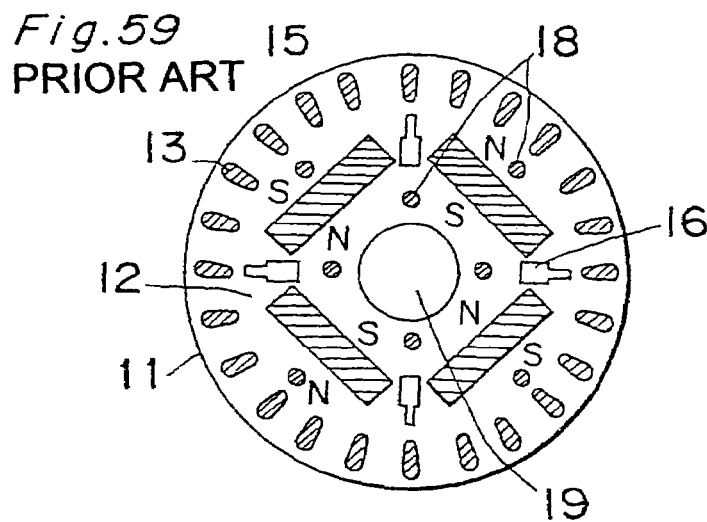
FIG. 59 is a cross-sectional view taken along the line A–A' in FIG. 58.

While after the aluminum die casting the shortcircuit rings will shrink in a radial direction during cooling of the aluminum, the rotor iron core 182 is also affected by a radially inwardly acting shrinkage stress. However, since the bridge portion 191 of the rotor iron core 182 is provided on each sides of each of the barrier slots 189 at a location adjacent the respective barrier slot 198 as shown in FIG. 58, a strength against the shrinkage stress is so high that circumferential shrinkage strains of an outer diameter of the rotor iron core 182 can be small.

On the other hand, since the bridge portion 187 is provided only at one location, strain acting in an inner diametric direction of the rotor iron core 182 at this portion is large. In order to avoid this, the length in a radial direction of the narrow portion 187a of the bridge portion 187 for prevention of the magnetic flux shortcircuit by magnetic saturation is reduced and, on the other hand, the large-width portion 187b is provided next to the narrow portion 187a, wherefore the strength against the radial shrinkage stress of the bridge portion 187 as a whole is made strong to prevent the strain from occurring in an inner diametric direction of the rotor iron core 182 at a location adjacent the bridge portion 187.

As such, the rotor iron core 182 can have an outer diameter of a shape substantially similar to the right round shape and, therefore, if the outer diameter thereof is so chosen at the time of blanking the electromagnetic steel plates of the rotor iron core 182 that a gap between the outer diameter thereof and an inner diameter of the rotor iron core can be of a predetermined dimension, a step of grinding or milling the outer diameter of the rotor iron core after the aluminum die casting to provide the gap of the predetermined dimension can be dispensed with.

Although in any one of the foregoing embodiments the single pole has been formed by abutting two plate-like permanent magnets of the same polarity in end-to-end fashion, the present invention may not be limited thereto and the single pole may be formed by the use of a single permanent magnet or three or more plate-like permanent magnets of the same polarity. Similarly, although the permanent magnets have been employed in the plate-like form, the present invention is not limited thereto and the present invention is equally applicable to the rotor employing permanent magnets of, for example, an arcuate shape or any other suitable shape.

Thus, according to the twenty-fourth embodiment of the present invention, not only can any possible shortcircuit of the magnetic fluxes between the permanent magnet be prevented to secure a high performance, but also the grinding of the outer diameter of the rotor is eliminated, thereby making it possible to provide the high-performance, inexpensive self-starting synchronous motor.

TWENTY-FIFTH EMBODIMENT (FIG. 63)

Figure 63:
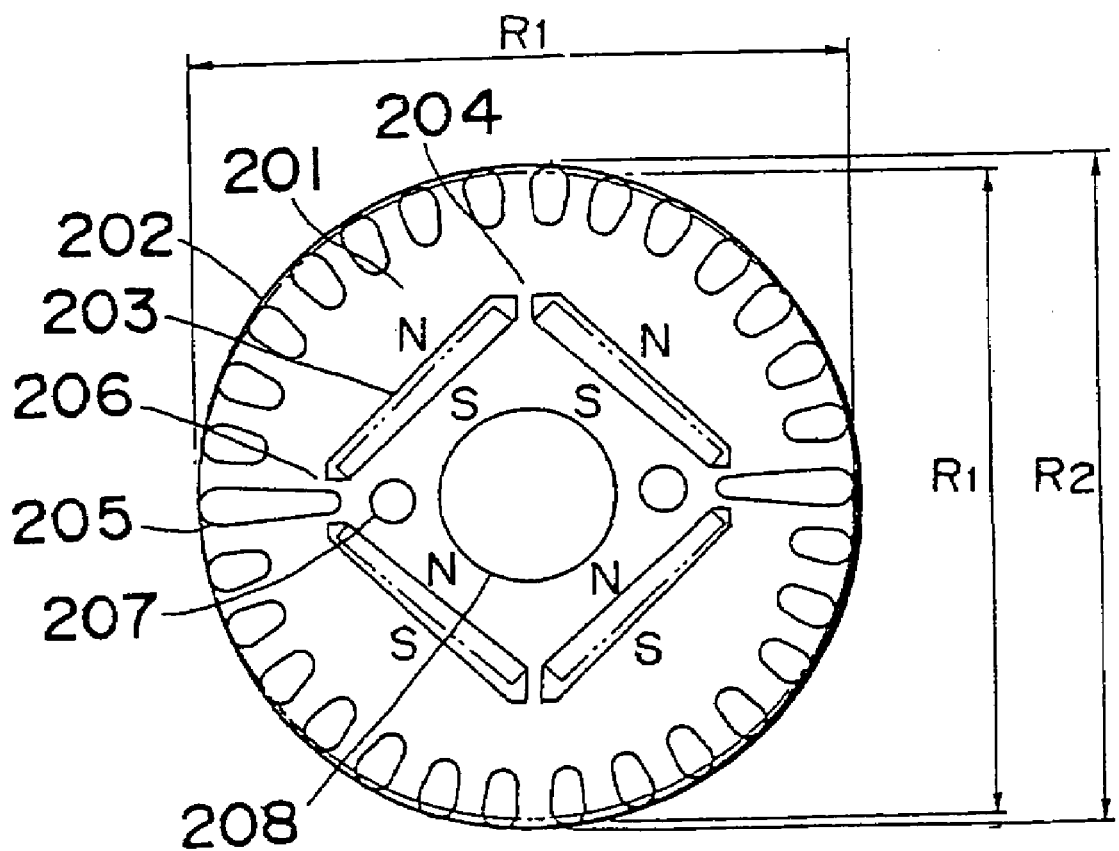
FIG. 63 is a plan view of the electromagnetic steel plate of the rotor used in the self-starting permanent magnet synchronous motor according to a twenty-fifth preferred embodiment of the present invention.

FIG. 63 illustrates a plan view of an electromagnetic steel plate used to form the rotor in the self-starting synchronous motor according to this embodiment. Referring now to this figure, reference numeral 51 represents an electromagnetic steel plate, a plurality of which are laminated together to form the rotor iron core. After the rotor iron core has been so formed, the rotor iron core is subjected to the aluminum die casting to form the starter squirrel cage conductor in the rotor iron core. Reference numeral 203 represents magnet retaining holes; reference numeral 204 represents a bridge portion F for each pair of the permanent magnets; reference numeral 205 represents barrier slots for prevention of shortcircuit of the magnetic fluxes; reference numeral 206 represents a bridge portion; reference numeral 207 represents rivet holes through which rivets are passed to secure the end plate to each axial end face of the rotor core; and reference numeral 208 represents a bearing hole. The permanent magnets to be inserted after the aluminum die casting are shown by double-dotted lines and the rotor has two rotor magnetic poles formed therein.

The electromagnetic steel plate 201 has an outer diameter that is set to an outer diameter R1 sufficient to allow a gap between the rotor and the inner diameter of the stator iron core at one end of the rotor to satisfy a predetermined dimension, which outer diameter R1 progressively increases towards a center point of the rotor magnetic pole so that the outer diameter R2 of the center portion of the rotor magnetic poles can be greater than the outer diameter R1. By blanking the electromagnetic steel plate of the above described shape and laminating a predetermined number of the electromagnetic steel plates to form the rotor iron core and after the starter squirrel cage conductor has been formed by the use of the aluminum die casting, the permanent magnets are mounted in the rotor iron core.

After the aluminum die casting, the shortcircuit rings (not shown) formed on the axially opposite end faces of the rotor iron core of the starter squirrel cage conductor undergo a shrinkage in a radial direction as they are cooled, accompanied by a radial shrinkage of the outer diameter of the rotor iron core under the influence of a shrinkage force of the shortcircuit rings.

At this time, since the rotor magnetic pole ends of the electromagnetic steel plates 201 of the rotor iron core have the bridge portion 206 defined at two locations, the strength is so high against the shrinkage stress in the inner diametric direction that the outer diameter R1 of the rotor iron core will not vary virtually. However, since at the center portion of the rotor magnetic poles the bridge portion 264 is defined only at one location, the strength is so low that the outer diameter R2 of the rotor iron core will shrink in a radial direction under the influence of the shrinkage stress. At this time, if the dimension of the outer diameter R2 is chosen to be R1 after shrinkage, the outer diameter of the rotor iron core as a whole can be maintained at a substantially round shape.

It is to be noted that although in FIG. 63 the circle of the outer diameter R1 after the shrinkage is shown by the double-dotted line, the difference in dimension between R1 and R2 are shown exaggerated to facilitate a better understanding.

Although in the foregoing embodiments the single pole has been formed by abutting two plate-like permanent magnets of the same polarity in end-to-end fashion, the present invention may not be limited thereto and the single pole may be formed by the use of a single permanent magnet or three or more plate-like permanent magnets of the same polarity.

According to the twenty-fifth embodiment of the present invention, since the outer diameter of the rotor iron core after the aluminum die casting attains a shape substantially similar to the right round shape, and since the gap between it and the inner diameter of the stator iron core can be formed by pre-blanking with the use of dies, there is no need to grind or mill the outer diameter of the rotor iron core and, therefore, the number of assembling steps can be reduced. Also, since the aluminum die casting is carried out while the permanent magnets and the end plates have not yet been fitted, the job can be easily performed with no defect parts occurring and, in view of those cumulative effect, the productivity can be increased.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed:

1. A synchronous motor comprising
   a stator including a stator iron core having a winding wound therearound, the stator iron core having an inner cylindrical surface;
   a rotor including a rotor iron core having a rotor comprising a plurality of electromagnetic steel plates, the rotor is located within the space defined by the inner cylindrical surface of the stator core, the rotor iron core including a magnet retaining portion defining magnet retaining slots, a magnetic flux short-circuit preventive portion coupled with the magnet retaining portion and defining magnetic flux short-circuit preventive holes communicating with the magnet retaining holes, and a rotor outer-end portion coupled with the magnetic flux short-circuit preventive portion and defining holes communicating with the magnetic flux short-circuit preventive holes; and
   a plurality of permanent magnets embedded within the magnet retaining slots in the magnet retaining portion of the rotor, the plurality of permanent magnets defining rotor magnetic poles;
   wherein the magnetic flux short-circuit preventive holes are smaller than the magnet retaining slots such that the permanent magnets are axially positioned by allowing the permanent magnets to engage the outer edges of the magnetic flux short-circuit preventive holes.

2. The synchronous motor as claimed in claim 1, the rotor further comprising a starter cage conductor.

3. A synchronous motor comprising:
   a stator including a stator iron core having a winding wound therearound, the stator iron core having an inner cylindrical surface;
   a rotor including a rotor iron core comprising a rotor laminate of a plurality of iron plates, the rotor is located within the space defined by the inner cylindrical surface of the stator core, the rotor iron core including a magnet retaining portion defining a plurality of magnet retaining slots and a permanent magnet support portion coupled to the magnet retaining portion and enclosing the plurality of magnet retaining slots; and
   a plurality of permanent magnets embedded within the plurality of magnet retaining slots in the magnet retaining portion of the rotor, the plurality of permanent magnets defining rotor magnetic poles;
   the permanent magnet support portion axially positioning the plurality of permanent magnets.

4. The synchronous motor as claimed in claim 3, further comprising a rotor iron core plate axially outer end coupled with the permanent magnet support portion and provided with a hole positioned axially of the plurality of magnet retaining slots.

5. The synchronous motor as claimed in claim 3, the rotor further comprising a starter cage conductor.

6. A synchronous motor comprising:
   a stator including a stator iron core having a winding wound therearound, said stator iron core having an inner cylindrical surface;
   a rotor including a rotor iron core that is located within the space defined by the inner cylindrical surface of the stator core, the rotor including a plurality of conductor bars positioned adjacent an outer peripheral portion of the rotor iron core, the conductor bars having corresponding opposite ends short-circuited by short-circuit rings, positioned at axially opposite ends of the rotor iron core, to form a starter cage conductor, the rotor iron core defining a plurality of magnet retaining holes positioned on an inner side of the conductor bars; and
   a plurality of permanent magnets embedded within the plurality of magnet retaining holes, a width of each of the plurality of magnet retaining holes positioned adjacent to an axial end of the rotor being greater than a width of each of the plurality of magnet retaining holes positioned inwardly from the axial end of the rotor.

7. The synchronous motor as claimed in claim 6, further comprising an electromagnetic steel plate positioned outside the axial end of the rotor and configured to close the plurality of magnet retaining holes.

8. The synchronous motor as claimed in claim 7, wherein an opposite axial end of the rotor does not include magnet retaining holes, closing the plurality of magnet retaining holes at a location inwardly from the opposite axial end of the rotor.

* * * * *

UNITED STATES PATENT AND TRADEMARK OFFICE
CERTIFICATE OF CORRECTION

PATENT NO. : 7,019,427 B2 Page 1 of 1
APPLICATION NO. : 11/035196
DATED : March 28, 2006
INVENTOR(S) : K. Sasaki et al.

It is certified that error appears in the above-identified patent and that said Letters Patent is hereby corrected as shown below:

On the Title page: at Item (56), References Cited, Other Publciations, "English Language Abstract of JP-29-23179" should be --English Language Abstract of JP 59-23179--.

Signed and Sealed this

Twenty-second Day of May, 2007

JON W. DUDAS
*Director of the United States Patent and Trademark Office*